United States Patent
Weinberger et al.

[11] 3,806,904
[45] Apr. 23, 1974

[54] REMOTE METER READ-OUT APPARATUS

[75] Inventors: Eugene M. Weinberger; Thomas M. Kirby; Bernard Last, all of Uniontown, Pa.

[73] Assignee: Rockwell Manufacturing Company, Pittsburgh, Pa.

[22] Filed: Jan. 21, 1972

[21] Appl. No.: 219,748

[52] U.S. Cl. ............... 340/188 R, 340/186, 340/206
[51] Int. Cl. ............................................ G08c 15/06
[58] Field of Search ................. 340/188 R, 186, 203

[56] References Cited
UNITED STATES PATENTS

| | | | |
|---|---|---|---|
| 3,006,712 | 10/1961 | Eichacker | 340/188 R |
| 3,046,534 | 7/1962 | Constant | 340/188 R |
| 3,324,438 | 6/1967 | Wopner | 340/188 R |
| 3,441,923 | 4/1969 | King | 340/188 R |
| 3,474,434 | 10/1969 | Lindberg | 340/188 R |
| 3,676,876 | 7/1972 | Dransfield | 340/188 R |

*Primary Examiner*—Thomas B. Habecker
*Attorney, Agent, or Firm*—John R. Bronaugh

[57] ABSTRACT

A remote meter reading apparatus for reading the decimal digit positions in a multi-digit number that is registered by a meter register. According to the disclosed embodiment, the meter reading apparatus includes a circuit at the meter for encoding the registration of the register counter wheels or other meter driven elements, and a portable read-out unit that is adapted to be connected to the encoding circuit by a transmission line for indicating the meter register reading. Various features include, among other things, a circuit arrangement that requires only a three-conductor transmission line for transmitting coded signals for reading up to four different orders of digits in the meter registration, an unbalanced bridge technique for detecting the position of each meter register counter wheel, an arrangement whereby the portable read-out unit has a meter reading register and a recorder for recording the registration on the remote meter reading register, a remote meter reading circuit that is responsive to a selectively developed command signal for first resetting the remote meter reading register, then advancing the remote meter reading register to read-out the meter reading, and then activating the recorder to record the registration of the remote meter reading register, a selector for selectively setting a desired number into the remote meter reading register and a circuit arrangement for recording the desired number, a circuit arrangement for detecting and signalling electrical defects in the encoding circuit at the meter register, and a circuit arrangement providing a source of identification for recordation by the recorder in the remote meter reading unit.

8 Claims, 15 Drawing Figures

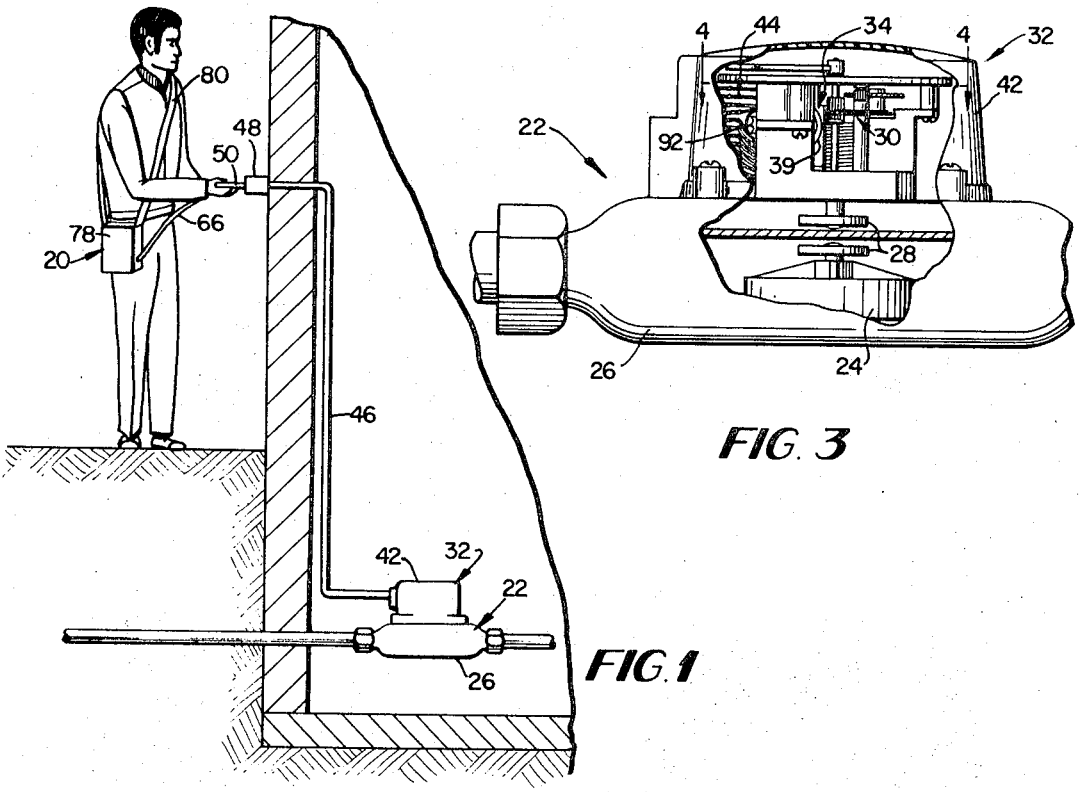
FIG. 3
FIG. 1
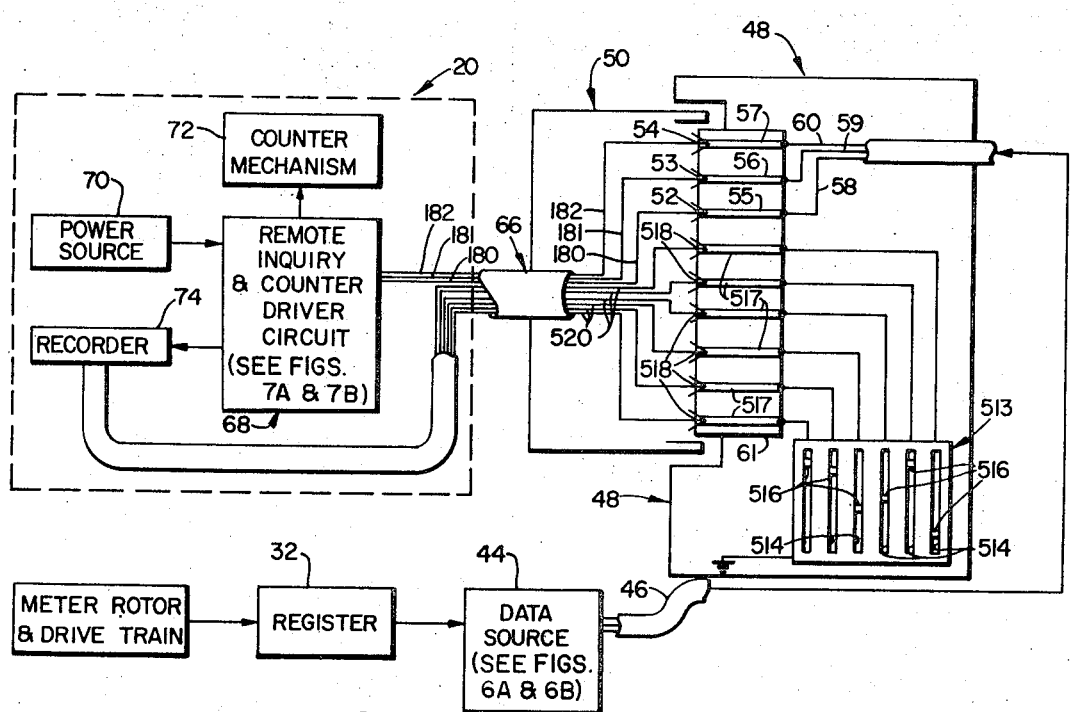
FIG. 2

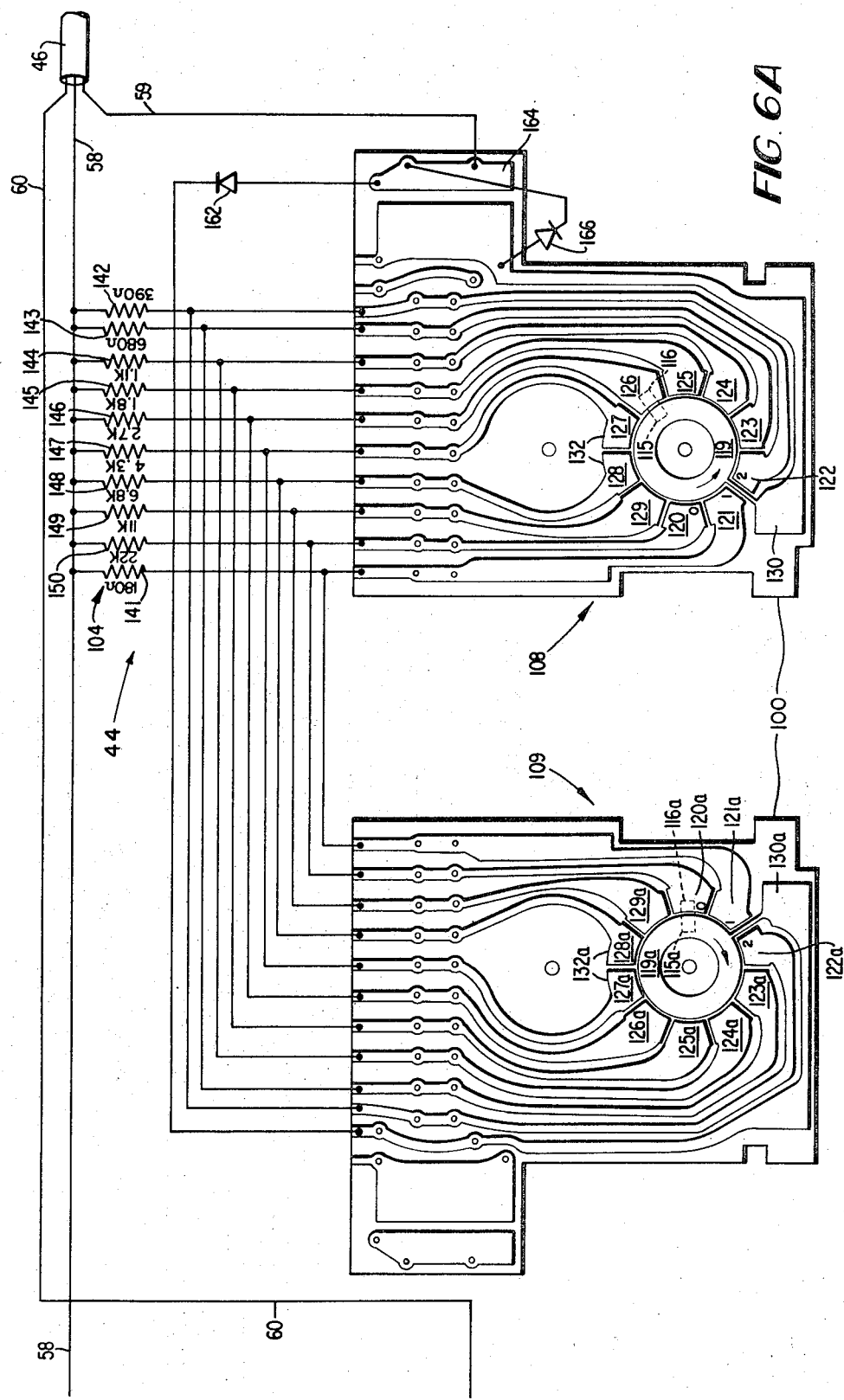

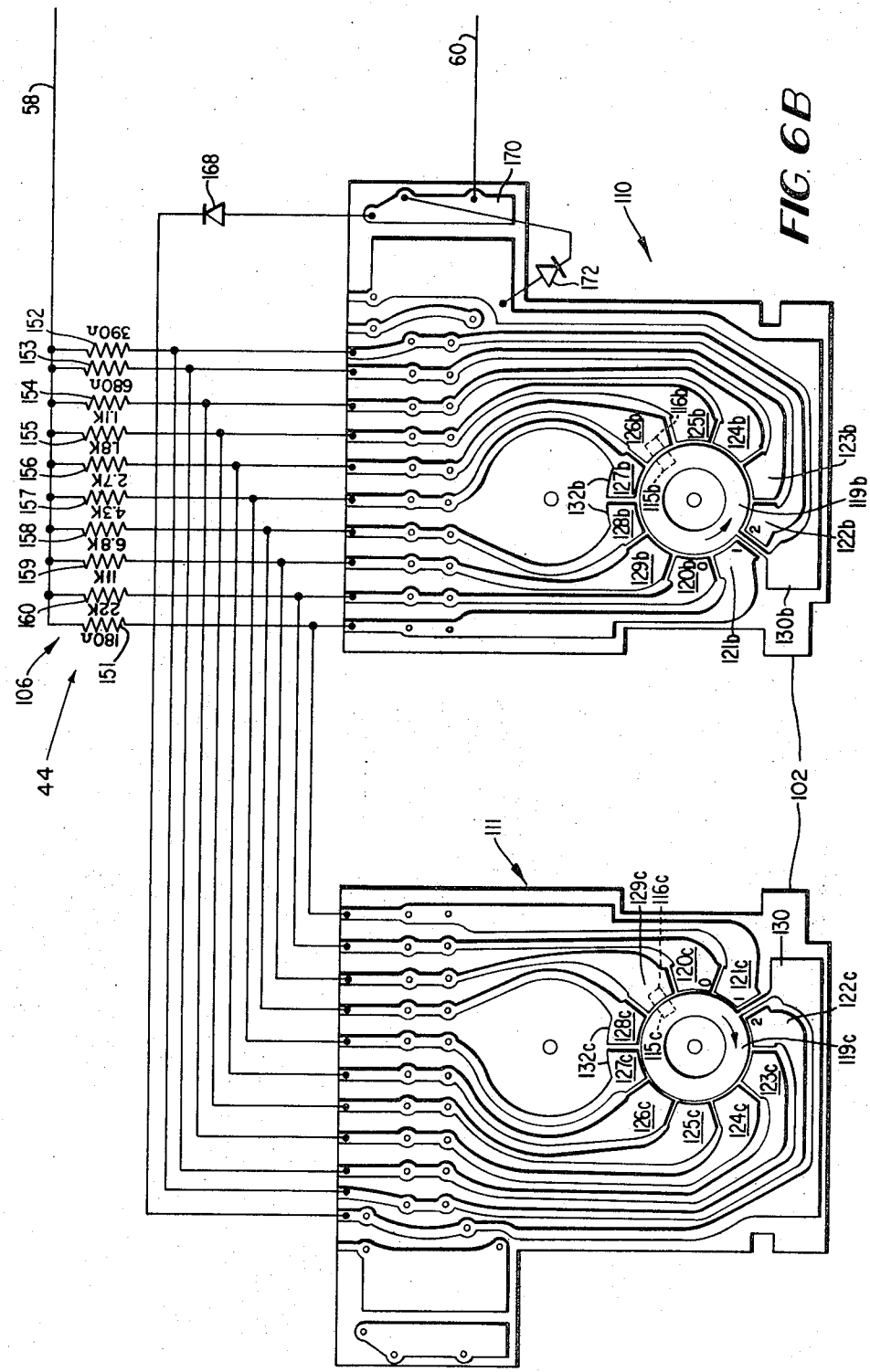

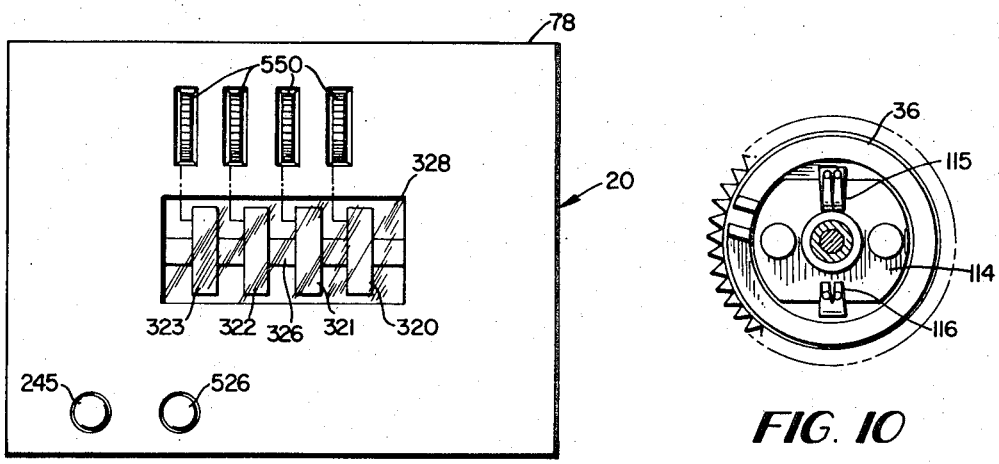
FIG. 9
FIG. 10
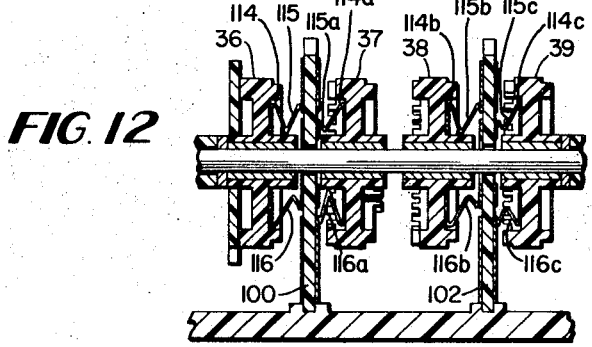
FIG. 12
| | COUNTER OUTPUT TERMINAL | | |
|---|---|---|---|
| | C | B | A |
| RESET | 0 | 0 | 0 |
| RESET | 0 | 0 | 1 |
| COUNTER 320 | 0 | 1 | 0 |
| COUNTER 321 | 0 | 1 | 1 |
| COUNTER 322 | 1 | 0 | 0 |
| COUNTER 323 | 1 | 0 | 1 |
| TURN-OFF | 1 | 1 | 0 |
FIG. 13
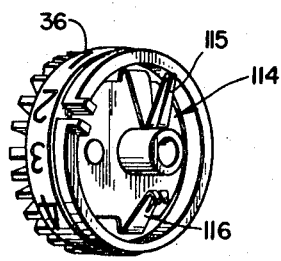
FIG. 11

3,806,904

REMOTE METER READ-OUT APPARATUS

FIELD OF THE INVENTION

This invention relates to remote meter reading apparatus.

BACKGROUND

Prior to this invention various systems have been proposed for remotely reading the measurement made by a meter. Some of these remote meter readers, as described, for example, in United States Letters Pat. Nos. 3,046,534 (issued to P. C. Constant, Jr. on July 24, 1962) and 3,069,670 (issued to H. F. Rondeau et al. on Dec. 18, 1962), are particularly useful for reading fluid flow meters and the like. These systems typically include a read-out device that is carried by the person making the reading. To take the remote reading the person plugs the meter reader into a connector which may conveniently be located on the outside of the building in which the meter is located. The connector is connected by a multiple conductor transmission line to a data storage circuit at the meter register. The storage circuit cumulatively stores the quantity of metered fluid and supplies it to the remote read-out unit when the latter is plugged into the previously mentioned connector.

Among the various shortcomings of these prior remote meter readers is the considerable number of conductors that are required to make connections between the above-mentioned connector and the remotely located storage or registration device at the meter. Furthermore, prior remote read-out systems that utilize a balanced bridge technique to determine a counter wheel position in the meter register are sensitive and require relatively expensive precision resistors in order to obtain accurate readings.

Another shortcoming of prior remote read-out systems is the lack of a convenient customer identification and method of recording the identification along with the meter reading. In this respect it will be appreciated that the meter reader may visit numerous customer installations, thus requiring a customer identification for each meter reading to ensure correct and proper billing.

Another disadvantage of remote read-out systems, such as the one described in the previously identified Rondeau et al patent, is the read-out circuit arrangement that requires a manual operation to read out each digit in the multi-digit number registered by the meter.

SUMMARY & OBJECTS OF INVENTION

In overcoming the foregoing and other disadvantages of prior systems the objects of this invention are:

1. The provision of an improved remote read-out apparatus for a meter;

2. The provision of a novel remote read-out apparatus that requires only a three-wire connection between an information storage circuit at the meter and a remote read-out unit for individually reading out as many as four different orders of digits in the meter registration;

3. The provision of a novel bridge circuit arrangement in which the position of a counter wheel or other quantity-indicating element at the meter is detected by a change from one of the unbalanced bridge conditions to the other of the unbalanced bridge conditions;

4. The provision of a novel remote read-out apparatus wherein a read-out unit is adapted to removably be plugged into a connector that is remote from the meter for reading out the meter registration and wherein a customer or installation-identifying data source is located in the connector;

5. The provision of a novel remote read-out apparatus which is semi-automatic in operation; 6. The provision of a novel remote read-out apparatus having a counter mechanism for remotely reading out the meter registration and a counter driver circuit for automatically setting the counter wheels in the remote counter mechanism to display the meter registration when the remote counter mechanism is selectively reset;

7. The provision of a novel remote read-out apparatus having a counter mechanism for remotely displaying the meter registration and a recorder for recording the number displayed by the counter. The counter wheels of the foregoing counter mechanism are furthermore capable of being selectively set to display a selected number whereby the registration of meters that are not equipped for a remote read-out may selectively be entered in the counter mechanism and recorded by the recorder;

8. The provision of a novel remote read-out apparatus wherein a remote read-out unit is equipped to detect and signal a short or open circuit in the data-supplying circuit at the meter;

9. The provision of a novel remote read-out unit in which a plurality of individually advanceable counter wheels are each advanced by pulses from a generator in the read-out unit to remotely display the meter registration;

10. The provision of a novel meter read-out apparatus having a data-supplying circuit at the meter, a read-out unit that is adapted to be electrically connected to the data-supplying circuit, a pulse counter mechanism in the remote read-out unit, and a pulse generator in the remote read-out unit for supplying pulses to advance the counter wheels in the counter mechanism; and 11. The provision of a novel remote read-out circuit for remotely reading out the output of a meter.

The remote read-out apparatus of this invention includes a data supply source at the meter and a remote read-out or data retrival unit that is carried by the person making the meter reading. The remote read-out unit is adapted to be electrically connected to signal-emitting encoding circuits in the data source through a transmission line.

In the preferred embodiment, the meter data source has one signal-emitting encoding circuit for each order of digits in the multi-digit decimal number to be read out. Each encoding circuit has a meter-driven contact or circuit completing element that is rotated in accordance with the meter output so that its data-representing position is indicative of the value of the digit in its associated order. Each contact element is associated with a series of data source resistors of different values, and for each data-representing position of the contact element, the contact element selects a different data source resistor and connects it to the transmission line.

In accordance with this invention, the selected data source resistors for the different orders of digits in the number to be read out are sequentially connected into one leg of a bridge circuit by a counter driver and sequencing circuit. The bridge circuit, the counter driver and sequencing circuit, and a step-variable impedance device form a part of the remote read-out unit.

The step-variable impedance device has a series of known resistors that are sequentially inserted into another leg of the bridge circuit by a pulse driven scanner for comparison with the data source resistor in the other bridge circuit leg. The novel remote read-out unit of this invention further includes a pulse generator for supplying scanner and counter-driving pulses, a pulse driven counter mechanism having a plurality of individually advanceable counter wheels, a cycle-counting control circuit for counting the number of cycles made by the scanner in the step-variable impedance, a detector circuit for detecting the condition of the bridge circuit, and a recorder. According to this invention, the counter driver and sequencing circuit receives the generator-supplied pulses for advancing the remote read-out counter wheels in a sequence that is determined by the cycle-counting control circuit, and the number of generator-produced pulses that are supplied to the counter driver and sequencing circuit for advancing each remote read-out counter wheel is controlled by the detector circuit.

In accordance with a further feature of this invention, the data-representing position of each contact element is not detected by a balanced bridge circuit condition. Instead, it is detected by a change in the bridge output potential from one unbalanced condition to the other. This is accomplished by selecting the resistance values of the step-variable impedance and the data source resistors in such a manner that the value of each data source resistor falls between the values of two successive resistances in the step-variable impedance. The previously mentioned detector circuit detects the change from one unbalanced bridge condition to the other. By virtue of this unbalanced bridge technique, the data source resistors may be of the relatively inexpensive, non-precision type.

In accordance with a further feature of this invention the counter driver and sequencing circuit is controlled by the cycle counting control circuit in such a manner that when a read-out command is selectively applied, the counter driver and sequencing circuit automatically resets the remote read-out counter wheels, then advances the remote read-out counter wheels in a preselected sequence to read out the output of the meter, and finally commands the recorder to record the registration of the remote read-out counter mechanism.

In addition to recording the meter output of registration, the recorder may also record an identification for billing or other purposes. In this invention, a data source providing such an identification is contained in a connector to which a signal transmitting part of remote read-out unit is selectively, removably connected. The connector, which may be in the form of a plug-receiving receptacle, is positioned at a location that is usually remote from the meter and preferably convenient to the meter reader. The connector is connected by the previously mentioned transmission line to the data source encoding circuits at the meter register.

In this invention, each of the counter wheels in the remote read-out unit is reset to a data void or an address position, and the step variable impedance scanner is operable to short circuit the step variable impedance bridge terminals at one stage in each scanning cycle. If the data source encoding circuit under interrogation has a short or open circuit, the corresponding counter wheel in the remote read-out unit will read out its data void instead of zero or one of the counter digits, thereby supplying a visual detection of a defect in the data source circuit. The recorder in the remote read-out unit may also be equipped to provide one audible signal when the counter wheels register zero or a digit and a different audible signal when any one or more of the counter wheels registers its data void, thereby providing an audible alarm of a defect.

In this invention, the transmission line that provides the connection between the data source at the meter and the remote read-out unit is required to have only three conductors for reading out as many as four different orders of digits in the number registered by the meter.

This is accomplished by providing two banks of the previously mentioned data source resistors, one for each selected pair of the previously mentioned contact elements. One of the transmission line conductors is a common that is connected to corresponding terminals of the data source resistors in both banks. A second conductor in the transmission is connected through separate unidirectional devices to the contact elements that are associated with one of the data source resistor banks, and the third conductor in the transmission line is connected through separate unidirectional devices to the contact elements that are associated with the other data source resistor bank. Depending upon its position, each contact element will be connected to a selected one of the data source resistors in its associated resistor bank. In this manner one pair of parallel circuit branches will be bridged across the common and the second conductor, and another pair of parallel circuit branches will be bridged across the common and the third conductor in the transmission line. Each of these circuit branches serially contains one of the contact elements, an associated unidirectional device, and the data source resistor that the contact element is connected to. The unidirectional devices allow for current flow through only one of each pair of circuit branches depending upon the polarity applied across the branches. The sequencing portion of the previously mentioned counter driver and the sequencing circuit provides a sequence of connections of the transmission line conductors to the bridge circuit terminals in such a manner that bridge current will flow through the four circuit branches in a sequence that is correlated with the sequence in which the remote read-out counter wheels are selected for advancement.

Further objects of this invention will appear as the description proceeds in connection with the appended claims and the below-described drawings.

DESCRIPTION OF DRAWINGS

FIG. 1 is a fragmentary view illustrating a building in cross section, a meter located in the building and equipped with the apparatus of this invention, and a meter reader carrying the remote readout unit of this invention;

FIG. 2 is a schematic of the remote read-out apparatus shown in FIG. 1;

FIG. 3 is a fragmentary, enlarged, partially sectioned side elevation of the meter shown in FIG. 1;

FIGS. 6A and 6B are schematics of the data source circuits at the meter;

FIG. 9 is a plan view of the portable, remote read-out unit shown in FIG. 1;

FIG. 10 is a section taken substantially along lines 10—10 of FIG. 4;

FIG. 11 is a perspective view of the circuit-completing contact plate shown in FIG. 10;

FIG. 12 is a section taken substantially along lines 12—12 of FIG. 4; and

FIG. 13 is a truth table for the cycle-counting counter shown in FIG. 7A.

DETAILED DESCRIPTION

Figure 4:
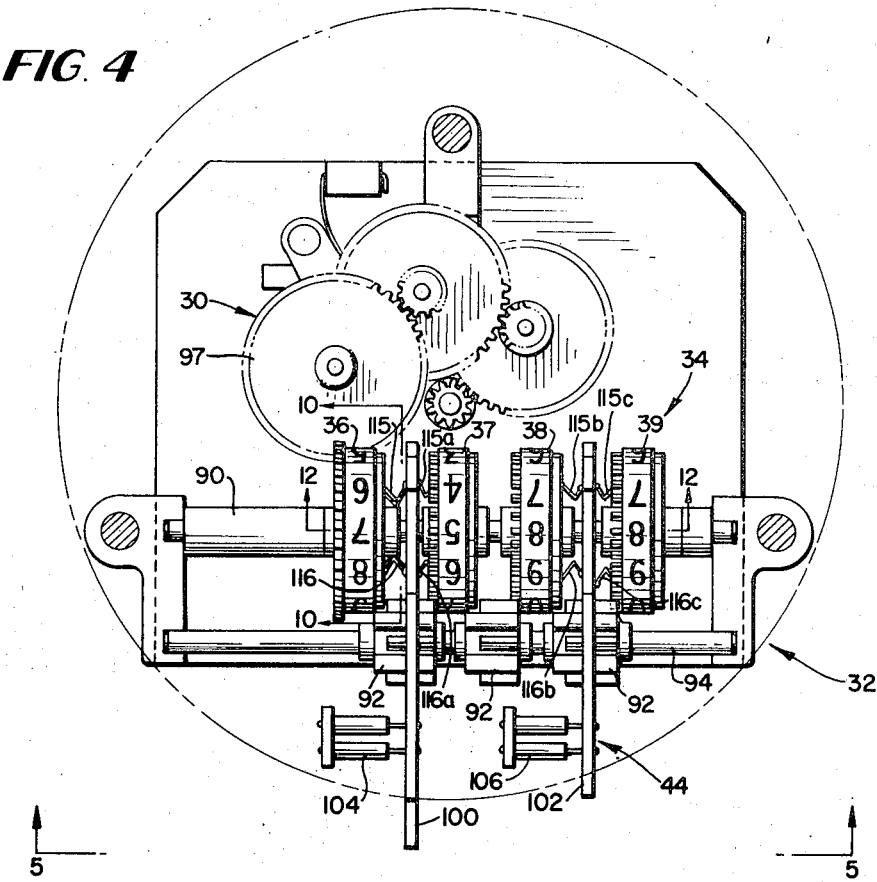
FIG. 4 is a section taken substantially along lines 4—4 of FIG. 3.

Referring to FIGS. 1 and 2 the remote meter read-out of this invention comprises a portable unit 20 for remotely displaying and recording the register reading of a meter 22. Meter 22 may be of any suitable, conventional type for metering fluids such as liquids.

As shown in FIG. 3, meter 22 generally comprises a fluid driven rotor 24 that is mounted for rotation in a meter housing 26. Rotor 24 is rotated by the flow of fluid through housing 26 and is drive connected by a magnetic coupling assembly 28 to a counter wheel drive train 30 in a register 32.

Figure 5:
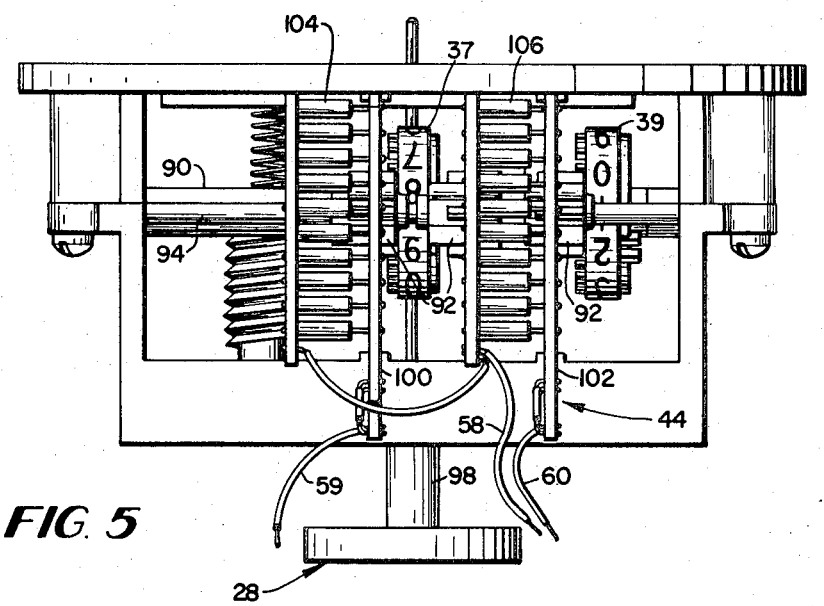
FIG. 5 is a section taken substantially along lines 5—5 of FIG. 4.

Referring to FIGS. 3-5, register 32 comprises a plural order, pinion type carry-over counter mechanism 34 which has a series of rotatable, shaft-mounted, axially aligned counter wheels 36, 37, 38 and 39 respectively representing four sequential orders of digits in a multi-digit decimal number such as thousands, ten thousands, hundred thousands and millions. It will be appreciated that the multi-digit number registered by the counter mechanism may begin with any desirable order such as tens or units. For metering water or other liquids, registration may be in terms of gallons. Additional counter wheels may be utilized if desired. The volume of fluid flowing through the meter is registered by the counter mechanism 34.

Counter mechansim 34 and drive train 30 may be of any suitable conventional construction such as that described in United States Letters Patent No. 3,534,619 issued on Oct. 20, 1970 for Register Drive Means. Counter mechanism 34 and drive train 30 are mounted in a casing 42 that is detachably fixed to housing 26.

As shown in FIGS. 4 and 5, a data source encoding apparatus 44 (see also FIG. 2) is mounted in casing 42 and, as will be described in detail later on, is operatively associated with counter mechanism 34 for supplying electrical signal conditions that represent the volume-indicating positions of counter wheels 36-39.

Electrical signals provided by apparatus 44 are transmitted by a three-conductor transmission line 46 to a connector which is in the form of a receptacle 48 as shown in FIGS. 1 and 2. Receptacle 48, as shown in FIG. 1, may be mounted on the outside wall of a building housing meter 22. Receptacle 48 may advantageously be accessible from the exterior of the building as shown and is adapted to detachably receive a probe or meter read-out gun 50 which is carried by the person making the meter reading.

As shown in FIG. 2, read-out gun 50 has a series of terminal contacts 52, 53 and 54 which are adapted to detachably engage corresponding terminals 55, 56, and 57 in receptacle 48 when read-out gun 50 is detachably plugged into the receptacle. Terminals 55-57 are respectively connected to the three conductors of transmission line 46 which are indicated at 58, 59 and 60.

As shown in FIG. 2, terminals 55-57 are advantageously in the form of printed terminal strips on a printed circuit card 61. Contacts 52-54 are in the form of edge connectors for contacting the printed terminal strips on card 61.

Contacts 52-54 are connected by a flexible multi-conductor cable 66 (FIGS. 1 and 2) to an inquiry and counter driver circuit 68 (FIG. 2) in unit 20. In addition to circuit 68, unit 20 mainly comprises a suitable power source 70, a counter mechanism 72, and a recorder 74. When gun 50 is plugged into receptacle 48, circuit 68 interrogates the signals supplied by apparatus 44 to drive counter mechanism 72 and to operate recorder 74 so that the reading on register 32 is remotely visually displayed by counter mechanism 72 and recorded by recorder 74 at unit 20.

Circuit 68, power source 70, counter mechanism 72 and recorder 74 are mounted in a casing 78 (FIG. 1). A shoulder strap 80, which is secured to casing 78, enables unit 20 to conveniently be carried by the meter reader as shown in FIG. 1.

Referring back to FIGS. 3-5, counter wheels 36-39 are rotatably mounted to a fixed shaft 90. The counter wheel-engaging carry pinions are indicated at 92 and are rotatably mounted on a fixed shaft 94. Drive train 30 is connected by an output member 97 to a counter wheel 36, and counter wheels 37-38 are respectively drive connected to counter wheels 37-39 in the usual, conventional manner by carry pinions 92. The input of drive train 30 constitutes a rotatable, gear-driving shaft 98, which is fixed to the follower magnet of the magnetic coupling 28.

As shown in FIGS. 4, 5, 6A and 6B, apparatus 44 comprises a pair of printed circuit cards 100 and 102 and two banks of resistors 104 and 106. Printed circuits 108 and 109 (see FIG. 6A) are respectively formed on opposite sides of card 100, and printed circuits 110 and 111 (see FIG. 6B) are respectively formed on opposite sides of card 102.

As best shown in FIG. 4, counter wheels 36 and 39 are respectively disposed adjacent to the oppositely facing sides of cards 100 and 102 and are respectively associated with circuits 108 and 111. Counter wheels 37 and 38 are disposed between cards 100 and 102 and are respectively associated with circuits 109 and 110.

As shown in FIGS. 10-12, an annular, electrically conductive contact plate 114 is coaxially fixed to the side of counter wheel 36 that faces circuit 108. Plate 114 is integrally formed with a pair of radially and diametrically oppositely extending spring leaf contact arms 115 and 116 that engage printed portions of circuit 108 in a manner to be described in detail later on.

As shown in FIG. 12, electrically conductive contact plates 114a, 114b and 114c, are respectively coaxially fixed to counter wheels 37, 38 and 39 in the same manner that plate 114 is fixed to wheel 36. Plates 114a, 114b, and 114c are of the same construction as plate 114. Accordingly, like reference characters suffixed by the letter a have been applied to designate the contact arms of plate 114a, like reference characters suffixed by the letter b have been applied to designate the contact arms of plate 114b, and like reference characters suffixed by the letter c have been applied to designate the contact arms of plate 114c.

As will be described in greater detail shortly, the contact arms of plate 114a engage printed portions of circuit 109, the contact arms of plate 114b engage printed portions of circuit 110, and the contact arms of plate 114c engage printed portions of circuit 111. The counter wheels (36-39) themselves are axially spaced apart from cards 100 and 102 to avoid friction-produced drag on rotor 24 and consequent impairment of meter accuracy.

As shown in FIG. 6A, printed circuit 108 comprises a printed conductive ring 119 and a series of ten printed conductive strips 120, 121, 122, 123, 124, 125, 126, 127, 128, and 129 that terminate in segments indicated at 132 to form a commutator-like construction coaxially surrounding ring 119. Ring 119 is connected to a further printed conductive strip indicated at 130. Ring 119 and strips 120-129 are electrically insulated from each other on card 100. This type printed circuit is conventional.

Circuit 110 is the same as circuit 108. Accordingly, like reference numerals suffixed by the letter b have been applied to designate like printed portions of circuit 110. Each of the circuits 109 and 111 is the mirror image of circuit 108. Thus, like reference numerals suffixed by the letter a have been applied to designate corresponding portions of circuit 109, and like reference numerals suffixed by the letter c have been applied to designate corresponding portions of circuit 111. Rings 119, 119a, 119b, and 119c are axially aligned with counter wheels 36-39.

Contact arm 115 is shorter than contact arm 116. Contact arms 115a, 115b, 115c 116a, 116b and 116c have the same dimensions as arms 115 and 116. Thus, contact arms 115, 115a, 115b, and 115c respectively engage only rings 119, 119a, 119b and 119c. Arm 116 engages the commutator segment of one of the conductive strips 120-129 depending upon the position of counter wheel 36, arm 116a engages the commutator like segment of one of the conductive strips 120a-129a depending upon the position of counter wheel 37, arm 116b engages the commutator like segment of one of the conductive strips 120b-129b depending upon the position of wheel 38, and contact arm 116c engages the commutator like segment of one of the strips 120c-129c depending upon the position of counter wheel 39.

Upon registration of the digits 0, 1, 2, 3, 4, 5, 6, 7, 8, and 9 on counter 36, contact arm 116 will engage conductive strips 120, 121, 122, 123, 124, 125, 126, 127, 128 and 129 respectively to thus complete a bridging circuit across ring 119 and the engaged one of conductive strips 120-129. The same arrangement and bridging circuit connection apply to counter wheels 37-39, their associated contact plates 114a, 114b and 114c and their associated printed circuits 109-111.

As described in the previously identified U.S. Pat. No. 3,534,619, drive train 30 has a snap-over anti-ambiguity mechanism that snaps counter wheel 36 with a sudden, rotary movement from one position to the next. Thus, contact arm 116 shifts rapidly with a snap action from each of the conductive strips 120-129 to the next adjacent conductive strip. As a result, contact arm 116 will not come to rest at a position where it engages two of the conductive strips at one time.

As shown in FIG. 6A, resistor bank 104 comprises a series of resistors 141, 142, 143, 144, 145, 146, 147, 148, 149 and 150, and resistor bank 106 (see FIG. 6B) similarly comprises as a series of resistors 151, 152, 153, 154, 155, 156, 157, 158, 159 and 160. In this invention, corresponding terminals of resistors 141-160 are connected to conductor 58 of transmission line 46. The other terminals of resistors 141-150 are respectively connected to conductive strips 121, 122, 123, 124, 125, 126, 127, 128, 129 and 120 and also respectively to conductive strips 121a, 122a, 123a, 124a, 125a, 126a, 127a 128a, 129a and 120a. Similarly the other terminals of resistors 151-160 are respectively connected to conductive strips 121b, 122b, 124b, 125b, 126b, 127b, 128b, 129b, and 120b and also respectively to conductive strips 121c, 122c, 123c, 124c, 125c, 126c, 127c, 128c, 129c and 120c. These connections of the resistor terminals at the circuit cards are each established in practice by extending the resistor lead through the associated printed circuit card and by soldering the resistor lead to the corresponding conductive strips on opposite sides of the printed circuit card.

As shown in FIG. 6A, conductive strip 130 is serially connected through a steering diode 166 and a conductive strip 164 to conductor 59. Conductive strip 130a is similarly serially connected through another steering diode 162 and conductive strip 164 to conductor 59. As shown, conductor 59 is electrically connected to conductive strip 164, and strip 164 is formed on circuit card 100 and is electrically insulated from circuits 108 and 109 except for the circuit connections through diodes 162 and 166.

With reference to FIG. 6B, conductive-strip 130b is serially connected through a steering diode 172 and a conductive strip 170 to conductor 60. Conductive strip 130c is connected serially through another steering diode 168 and conductive strip 170 to conductor 60. Conductor 60 is electrically connected to strip 170, and strip 170 is formed on circuit card 102 and is electrically insulated from circuits 110 and 111 except for the connections through diodes 168 and 172.

It will be appreciated that a bridging circuit connection is completed across conductors 58 and 59 by each of the contact plates 114 and 114a. For contact plate 114, for example, the completed circuit connection between conductors 58 and 59 may be traced from conductor 59, through conductive strip 164, through diode 166, through conductive strip 130, through ring 119, through contact arm 115 (which is contacting ring 114), through contact arm 116, through the one of the conductive strips 120-129 that arm 116 is in contact with, and to conductor 58 through one of the resistors in bank 104.

Each of the contact plates 114b and 114c completes a circuit connection between conductors 58 and 60 in a manner similar to that just described for contact plates 114 and 114a.

From the foregoing it further will be appreciated that contact plates 114 and 114a complete two parallel circuit branches that are bridged across conductors 58 and 59. The parallel circuit branch containing contact plate 114 includes, in series, diode 162, contact plate 114, and that resistor in bank 104 which is connected to the contacted one of strips 120–129. Similarly, the parallel circuit branch containing contact plate 114a includes, in series, diode 162, contact plate 114a, and that resistor in bank 104 that is connected to the contacted one of conductive strips 120a–129a.

Similarly, contact plates 114b and 114c complete two parallel circuit branches that are bridged across conductors 58 and 60. The circuit branch containing contact plate 114b includes, in series, diode 172, contact plate 114b, and that resistor in bank 106 that is connected to the contacted one of conductive strips 120b–129b. The circuit branch containing contact plate 114c includes, in series, diode 168, contact plate 114c and that resistor in bank 106 that is connected to the contacted one of conductive strips 120c–129c.

Diodes 162 and 166 are so connected that they allow direct current to flow through only one of the two parallel circuit branches containing plates 114 and 114a when d.c. power of given polarity is applied to conductors 58 and 59. It will be noted that the anode of diode 162 and the cathode of diode 166 are connected through strip 164 to conductor 59. Thus for one polarity, current will flow through the circuit branch containing contact plate 114, but not through the circuit branch containing contact plate 114a. When the polarity is reversed, current will flow through the circuit branch containing contact plate 114a, but not through the circuit branch containing contact plate 114.

Diodes 168 and 172 are connected and function in the same manner as that just described for diodes 162 and 166. Thus for one polarity condition at conductors 58 and 60, direct current will flow through the circuit branch containing contact plate 114b, but not through the circuit branch containing contact plate 114c. When the polarity is reversed, current will flow through the circuit branch containing contact plate 114c, but not through the circuit branch containing plate 114b.

Each of the resistors 141–150 is provided with a selected resistance value that is significantly different from the values of each of the other resistors in bank 104. Resistors 151–160 are provided with selected resistances that are the same as resistors 141–150 respectively.

Referring to FIG. 2, cable 66 comprises three electrically insulated conductors 180, 181, and 182 which are respectively connected to terminal contacts 52, 53 and 54 in gun 50. When gun 50 is plugged into receptacle 48, conductors 180, 181, and 182 thus provide continuations of conductors 58, 59 and 60 respectively. Signal voltages supplied by apparatus 44 are thus transmitted to circuit 68 by plugging gun 50 into receptacle 48.

Figure 7A:
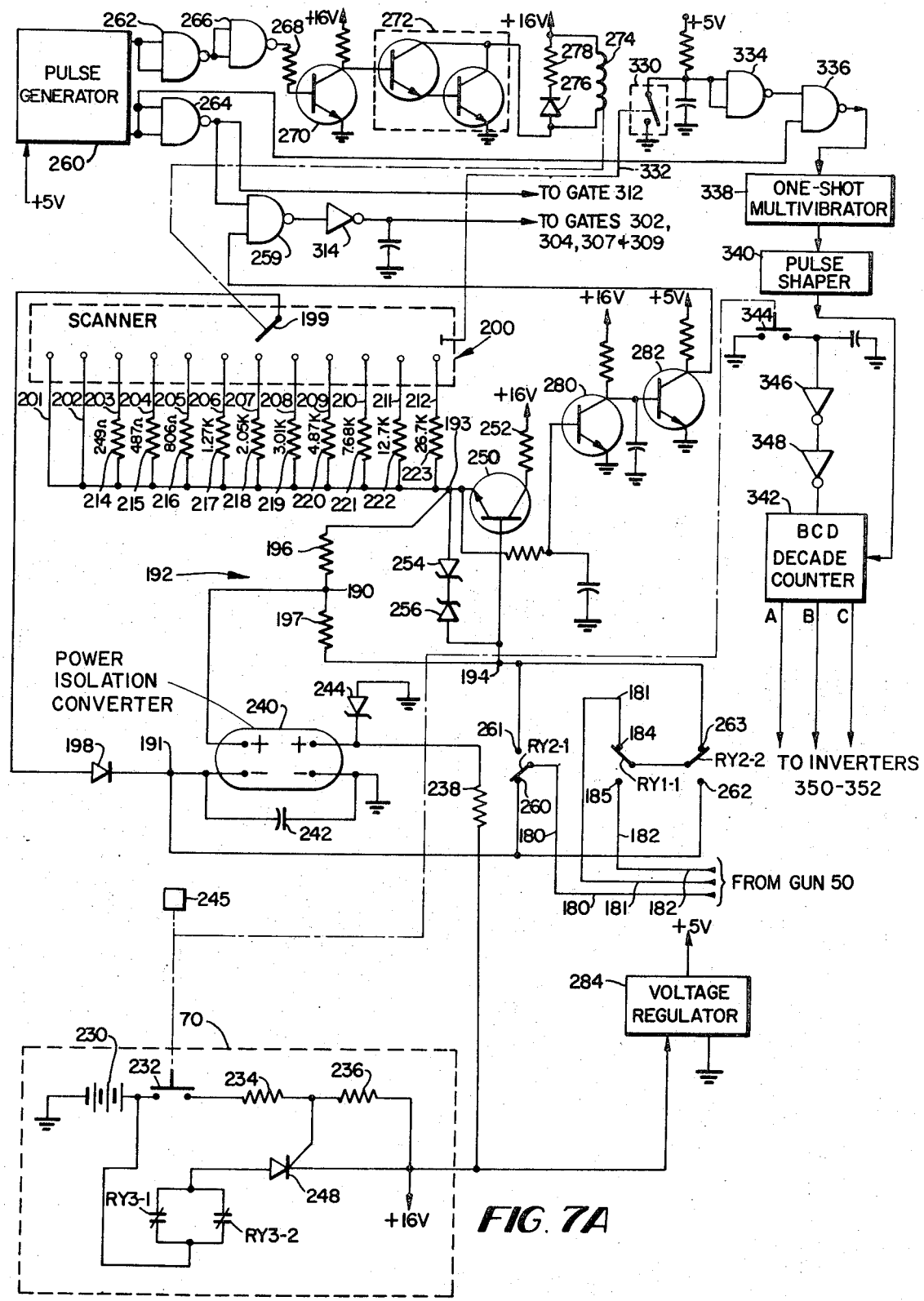
FIGS. 7A and 7B are schematics of the circuit in the remote read-out unit that is adapted to be carried by the meter reader.

As shown in FIG. 7A, conductor 180 is connected to the movable contact element RY2-1 of relay RY2. Conductors 181 and 182 are respectively connected to fixed or stationary contacts 184 and 185 of a further relay RY1.

Figure 7B:
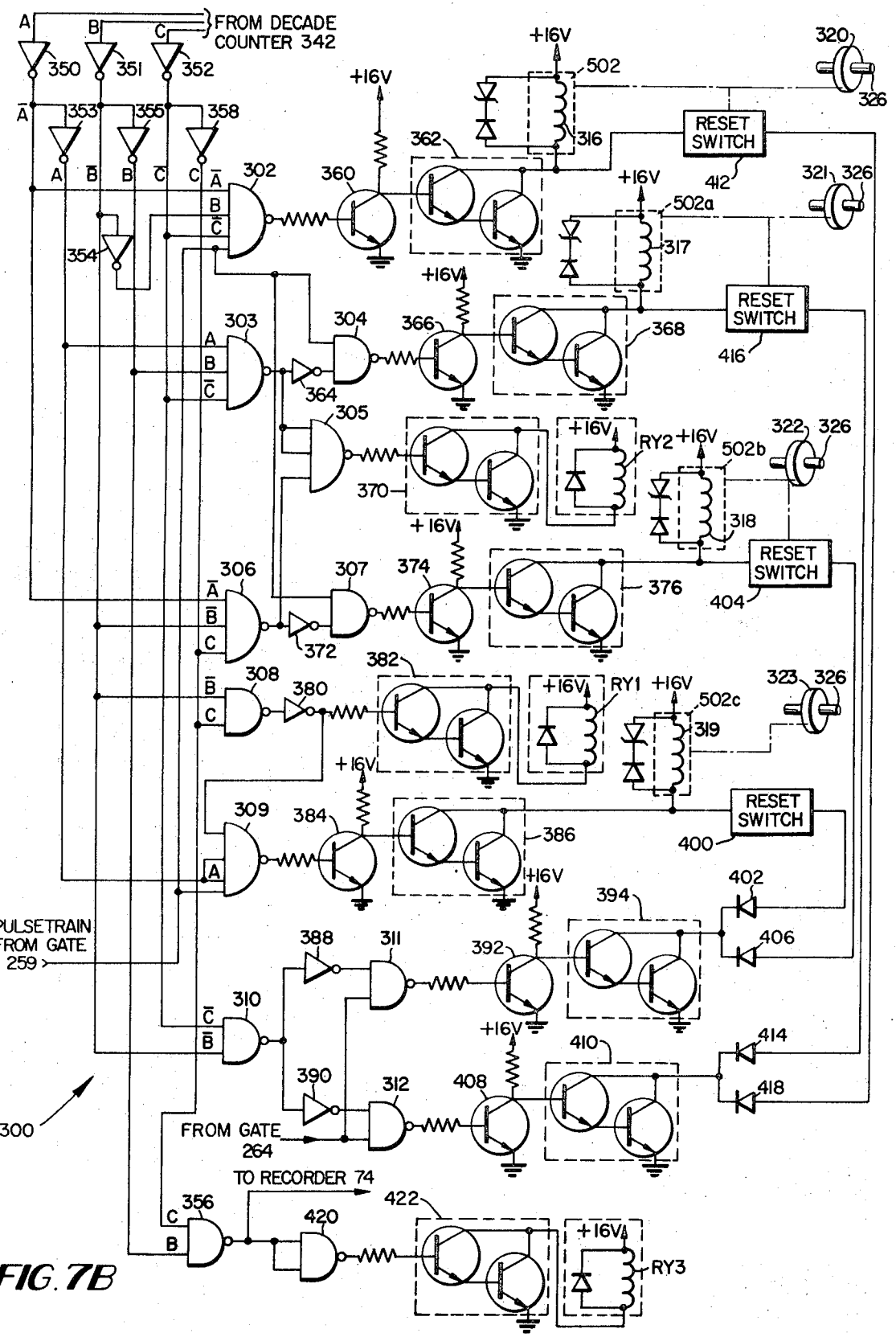

Relays RY1 and RY2 form a part of circuit 68. The other components of circuit 68 are shown in FIGS. 7A and 7B and will now be described.

Relays RY1 and RY2 are operative in a manner to be explained in detail later on to sequentially connect the active portions of circuits 108–111 between terminals 194 and 191 (FIG. 7A) of a bridge circuit 192. The active portions of each of these data source circuits form one leg of the bridge circuit 192.

The other two terminals of bridge circuit 192 are respectively indicated at 193 and 190 in FIG. 7A. The leg of bridge circuit 192 that is connected between terminals 190 and 193 comprises a resistor 196. The leg of bridge circuit 192 that is connected between terminals 190 and 194 comprises another resistor 197 which has a resistance value that is the same as resistor 196. The leg of bridge circuit 192 that is connected between terminals 191 and 193 comprises, in series, a blocking diode 198, a resistor scanning contact arm 199, and a branch circuit in a scanner bank 200.

Diode 198 has its cathode connected to terminal 191 and its anode connected to contact arm 199. Bank 200 has a series of parallel circuit branches 201, 202, 203, 204, 205, 206, 207, 208, 209, 210, 211, and 212. Circuit branches 201–212 have corresponding terminals which are successively contacted by the scanning contact arm 199. The other terminals of circuit branches 201–212 are connected by a common line to terminal 193.

Circuit branches 201 and 202 contain no resistors. When connected in the bridge, each of these circuit branches effectively provides a short circuit between terminals 191 and 193 for a purpose to be described later on. Circuit branches 203–212, on the other hand, respectively contain precision resistors 214, 215, 216, 217, 218, 219, 220, 221, 222, and 223. When contact arm engages the scanning terminals of circuit branches 203–212, each of the resistors 214–223 will sequentially be connected between terminal 193 and the anode of diode 198.

Current is applied to bridge circuit 192 by power source 70, which, as shown in FIG. 7A, comprises a battery 230 having its negative terminal connected to ground and its positive terminal connected serially through a read-out spring loaded push button switch 232, a voltage dropping resistor 234, another resistor 236, and still another resistor 238 to the positive input terminal of a conventional d.c. to d.c. converter 240. The negative input terminal of converter 240 is connected to ground as shown. The positive and negative output terminals of converter 240 are respectively connected to terminals 190 and 191 of bridge circuit 192 to thus apply the d.c. battery voltage across bridge circuit 192.

Converter 240 provides isolation between the power source 70 and circuit 68 to avoid current leakage. A noise suppressing capacitor 242 is shunted across the negative input and output terminals of converter 240. Capacitor 242 is effective to shunt out abrupt changes in the direct current.

A 12 volt zener diode 244, which is connected between ground and the positive input terminal of converter 240, limits the voltage across the positive and negative input terminals of converter 240 to 12 volts.

The pushbutton for switch 232 is indicated at 245 and may advantageously be mounted in the top wall of casing 78 as shown in FIG. 9 for ready access and operation by the meter reader. By momentarily closing switch 232 a pulse is applied to the anode gate of a silicon controlled electric current conducting switch 248 to turn switch 248 on. When switch 248 is turned on, a holding circuit is completed through two parallel connected normally closed sets of contacts RY3-1 and RY3-2 of a relay RY3 and through switch 248 which is in series with contact RY3-1 and RY3-2. When completed, this holding circuit shunts switch 232 as shown. By momentarily closing switch 232, therefore, power source voltage is applied across the bridge circuit input terminals 190 and 191 and this voltage will continue to be applied after switch 232 is released and until relay RY3 is energized to open contacts RY3-1 and/or RY3-2.

As shown in FIG. 7A a polarity sensing transistor 250 is bridged across the output terminals 193 and 194 of bridge circuit 192. The base of transmitter 250 is connected by a lead to terminal 194, and the emitter of transistor 250 is connected by a lead to terminal 193. The collector of transistor 250 is connected through a resistor 252 to the positive 16 volt terminal of power supply 70. A pair of zener diodes 254 and 256 are connected in series in a circuit branch that is bridged across terminals 193 and 194 in shunting relation to the emitter-base junction of transistor 250. Diodes 254 and 256 limit the reverse bias voltage on transistor 250 to keep the junction from popping.

With continued reference to FIG. 7A, the fixed contacts associated with relay contact element RY2-1 are indicated at 260 and 261 and are respectively connected to terminals 191 and 194. The fixed or stationary contacts associated with relay contact element RY2-2 are indicated at 262 and 263 and are respectively connected to terminals 191 and 194 in parallel relation with the circuit connection established by relay contact RY2-1. The movable contact element RY2-2 is connected by a lead to the movable contact element RY1-1 as shown.

With the foregoing relay contact circuit connections, operation of relay RY1 determines which of the two printed circuit cards is selected for interrogation, and relay RY2 operates in conjunction with the previously described steering diodes in circuits 108-111 to determine which circuit of the selected printed circuit card is to be interrogated and read out.

More particularly, it will be appreciated that when both relays RY1 and RY2 are de-energized, a bridge circuit leg is completed from terminal 194 through the movable relay contact element RY2-2, through the movable relay contact element of RY1-1, through conductors 181 and 59, through the active portion of circuit 108, through the resistor of bank 104 that is connected to the active circuit by contact plate 114, through conductors 58 and 180, and through the movable relay contact element RY2-1 to the negative input terminal 191 of bridge circuit 192.

When relay RY2 is energized, the movable contact element RY2-1 will be transferred into contact with the stationary contact 261 and the movable contact element RY2-2 will be transferred into contact with the stationary contact 262. As a result, the resistor of bank 104 that is connected in the active circuit by contact arm 116a will be connected in bridge circuit leg between terminals 191 and 194.

The foregoing bridge leg may be traced from terminal 194, through the stationary contact 261, through the movable contact element RY2-1, through conductors 180, and 58, through the resistor of bank 104 that is connected to contact arm 116a by circuit 109, through the active portion of circuit 109, through diode 166, through conductors 59 and 181, through the movable contact elements RY1-1 and RY2-2 and through the stationary contact 262 to terminal 191.

When relay RY1 is energized, the movable contact element RY1-1 will be transferred into contact with the stationary contact 185. Thus, when both relays RY1 and RY2 are energized, the resistor of bank 106 that is connected to contact arm 116b will be placed in the active bridge circuit leg between terminals 191 and 194. This circuit may be traced from terminal 194 through stationary contact 261, through the movable contact element RY2-1 through conductors 180 and 58, through that resistor in bank 106 which is connected to contact arm 116b by circuit 110, through the active portion of circuit 110 as previously described, through diode 168, through conductors 60 and 182, through stationary contact element 185, through the movable contact elements RY1-1 and RY2-2, and through the stationary contact element 262 to terminal 191.

When relays RY1 and RY2 are respectively energized and de-energized, the resistor of bank 106 that is connected to contact arm 116c will be placed in the active bridge circuit leg between terminals 191 and 194. This circuit may be traced from terminal 194, through stationary contact element 263, through the movable contact elements RY2-2 and RY1-1, through the stationary contact element 185, through conductors 182 and 60, through diode 174, through the active circuit portion of circuit 111, through the resistor in bank 106 that is connected by circuit 111 to contact arm 116c, through conductors 58 and 180, through the movable contact element RY2-1, and through the stationary contact element 260, to terminal 191.

In this invention, the values of the resistors that are placed in bridge circuit 192 are so selected that a null or balanced bridge condition does not occur. Instead, the volume-indicating position of the meter register counter wheel under interrogaton will be detected by a change from one unbalanced condition of the bridge circuit to the other unbalanced condition of the bridge circuit. For this purpose, each of the resistors 214-223 has a preselected value that falls between the resistance values of two selected resistors in bank 104 and also two selected resistors in bank 106.

When counter wheel 36 registers the digits 1, 2, 3, 4, 5, 6, 7, 8, 9, and 0 resistors 141, 142, 143, 144, 145, 146, 147, 148, 149, and 150 will respectively be connected in the bridge circuit leg between terminals 191 and 194 upon deenergization of relays RY1 and RY2. Similarly, when counter wheel 37 registers the digits 1, 2, 3, 4, 5, 6, 7, 8, 9, and 0, resistors 141, 142, 143, 144, 145, 146, 147, 148, 149 and 150 will be respectively connected in the bridge circuit leg between terminals 191 and 194 by contact plate 114a when relays RY1 and RY2 are respectively de-energized and energized. Starting with the resistor having the lowest resistance, the order of resistors 141-150 and 214-223 according to their resistance values is as follows: Resistor 141, resistor 214, resistor 142, resistor 215, resistor 143, resistor 216, resistor 144, resistor 217, resistor 145, resistor 218, resistor 146, resistor 219, resistor 147, resistor 220, resistor 148, resistor 221, resistor 149, resistor 222, resistor 150, and resistor 223. It will be recalled that the resistance values of resistors 151–160 are the same as the values of resistors 141–150.

When counter wheel 38 registers the digits 1, 2, 3, 4, 5, 6, 7, 8, 9, and 0, resistors 151, 152, 153, 154, 155, 156, 157, 158, 159 and 160 will respectively be connected in the bridge circuit leg between terminals 191 and 193 by contact plate 114b upon energization of both relays RY1 and RY2. Similarly, when counter wheel 39 registers the digits 1, 2, 3, 4, 5, 6, 7, 8, 9, and 0 resistors 151, 152, 153, 154, 155, 156, 157, 158, 159, and 160 will respectively be connected in the bridge circuit leg between terminals 191 and 193 by contact plate 114c when relays RY1 and RY2 are respectively energized and de-energized.

Representative values of resistors 141–150, 151–160 and 214–233 are shown in the drawing.

Since scanning arm 199 is stepped in a direction to connect precision resistors of successively increasing values into the bridge circuit leg between terminals 191 and 193, the position of the meter register counter wheel under interrogation will be detected by a change from an underbalanced bridge condition to an overbalanced bridge condition. It will be appreciated, however, that the circuit connections may be effectuated to detect the meter register counter wheel position by a change from an overbalanced bridge condition to an underbalanced bridge condition.

Referring to FIG. 7A, it will be appreciated that transistor 250 will be forward biased and therefore conducting as long as the resistance value of the precision resistor (of bank 200) that is connected between terminals 191 and 193 is less than the resistance value of the data source resistor that is connected in the bridge circuit leg between terminals 191 and 194. Under such a condition the bridge will be underbalanced and the voltage at terminal 194 will be less negative then the voltage at terminal 191. But when scanning arm 199 has stepped to a position for placing the first resistor of bank 200 in the bridge leg circuit that is greater than the data source resistor in the bridge leg circuit between terminals 194 and 191, the bridge circuit becomes overbalanced, and the voltage at terminal 193 will become more negative than the voltage at terminal 191. As a result, transistor 250 will become reversed biased and therefore will stop conducting.

Since detection of the meter counter wheel registration position does not depend upon a balanced bridge condition, resistors 141–160 may be of the non-precision, relatively inexpensive type to reduce manufacturing costs.

With continued reference to FIG. 7A, circuit 68 further includes a pulse generator or clock 260 that is operative to produce pulses of substantially constant, preselected repetition frequency (i.e., equal time separations between pulses) at each of two outputs. The two outputs of clock 260 are connected respectively to the input sides of two Nand gates 262 and 264. Clock 260 may be of any suitable, conventional type. The input connections to each of the Nand gates 262 and 264 are such that the gates operate as inverters.

The output of Nand gate 262 is connected to both inputs of a further Nand gate 266, and the output of Nand gate 266 is connected through a resistor 268 to the base of a transistor 270. The collector of transistor 270 is connected through a resistor to the +16 volt terminal of power source 70 and also to the transistor base of a Darlington 272. The collector output of Darlington 272 is serially connected through a stepper coil 274 to the +16 volt terminal of power source 70. Shunted across coil 274 is a circuit branch having a diode 276 and a resistor 278 in series with diode 276. Gates 262 and 264 provide an isolating interface between pulse generator 260 and other portions of circuit 68. The pulses supplied by generator 260 through gate 262 are amplified by transistor 270 and also by Darlington 272 for pulsing coil 274. Coil 274 is operatively connected to scanning arm 199. For each pulse supplied by clock 260, coil 274 will step scanning arm 199 from one circuit branch to the next in bank 200, starting with circuit branch 201 and proceeding to circuit branch 212.

As will be described in greater detail later on, transistor 250, when forward biased, will enable a Nand gate 259 for supplying counter-driving pulses to advance that counter wheel in the remote read-out counter mechanism 72 that corresponds to the meter register counter wheel under interrogation. When transistor 250 is reverse biased gate 259 will be inhibited, thus blocking the supply of counter wheel-driving pulses to stop advancement of the counter wheel in mechanism 72.

Still referring to FIG. 7A, the emitter of transistor 250 is connected through a resistor to the base of a further transistor 280. Transistor 280 amplifies the signal voltage on the emitter of transistor 250. The collector of transistor 280 is connected through a resistor to the −16 volt terminal of power source 70 and also to the base of a further transistor 282.

Transistor 282 amplifies the signal voltage on the collector of transistor 280. The collector of transistor 282 is connected through a resistor to a +5 volt output terminal of a voltage regulator which is indicated at 284 in FIG. 7A. Voltage regulator 284 receives current from power source 70 and may be of any suitable form for producing a regulated 5 volt d.c. signal voltage at its output.

With continued reference to FIG. 7A, the collector of transistor 282 is connected to one input of gate 259. The other input of gate 259 is connected to the output of gate 264.

With reference to the logic circuit described herein, a logic "1" or a "high" designates a suitable, positive d.c. signal voltage, and a logic "0" or a "low" designates a substantially zero d.c. signal voltage. The disclosure herein assumes positive logic merely for the purpose of description.

The gating signal supplied by transistor 250 through transistors 280 and 282 to one input of gate 259 will be high when transistor 250 is forward biased and will be low when transistor 250 is reversed biased. Thus, the transistor signal applied to one input of gate 259 will be high when bridge circuit 192 is underbalanced and will be low when bridge circuit 192 is overbalanced. Gate 259 is therefore enabled to gate clock pulses to a counter driver and sequencing circuit 300 (FIG. 7B) only when transistor 250 is forward biased and, consequently, only when bridge circuit 192 is underbalanced.

Circuit 300 forms a part of circuit 68, and, as shown in FIG. 7B, comprises a series of Nand type logic gates 302, 303, 304, 305, 306, 307, 308, 309, 310, 311 and 312. The output of gate 259 is connected through an inverter 314 to the input sides of gates 302, 304, 307, and 309. When gates 302, 304, 307, and 309 are enabled, the clock pulses gated through gate 259 will be applied to respectively pulse counter stepping coils 316, 317, 318, and 319 in a manner to be described in greater detail later on.

Coils 316, 317, 318 and 319 respectively drive counter wheels 320, 321, 322, and 323 which form a part of counter mechanism 72 in unit 20. Counter wheels 320, 321, 322, and 323 are thus driven independently of each other, and the orders of counter wheels 320, 321, 322, and 323 respectively correspond to the orders of the meter register counter wheels 36, 37, 38, and 39. As distinguished from the 10-position counter wheels in meter register 32, counter wheels 320–323 are each of the twelve position type. 10 positions are marked to read out the digits one through nine and zero. The eleventh and twelth positions on each of the counter wheels 320–323 represent reset, data void or address positions and may respectively be marked by the letters Z and N or any other suitable symbol that is not zero or a digit. For advancement in one predetermined direction, the positions on each of the counter wheels 320–323 are as follows: Z, N, 1, 2, 3, 4, 5, 6, 7, 8, 9, and 0. When counters 320–323 are reset they will register the letter Z.

Counter wheels 320–323 may be mounted on a fixed shaft 326 (see FIG. 7B) which is suitably non-rotatably mounted in casing 78. The register-indicating positions of counter wheels 320–323 are viewable through a window 328 in the top wall of casing 78 as shown in FIG. 9. The control circuit for enabling and disabling the gates in circuit 300 and also for controlling operation of relays RY1 and RY2 is shown in FIG. 7A and comprises a normally open switch 330 which is momentarily tripped to its closed position by a suitable motion transmitting mechanism (schematically indicated at 332 in FIG. 7A) after scanning arm 199 has completed its interrogation of circuit branch 212 and when arm 199 is stepping from circuit branch 212 to start a new cycle.

One terminal of switch 330 is connected to ground, and the other terminal of switch 330 is connected to both input terminals of Nand gate 334. Both inputs of gate 334 are also connected through a resistor to the positive 5 volt output terminal of regulator 284. Thus when switch 330 is open, the output of gate 334 will be low or a logic 0, and when switch 330 is closed to tie the input pins of gate 334 to zero volts, the output of gate 334 is high or a logic 1. The output of gate 334 is connected to one input of another Nand gate 336. The other input of gate 336 is connected to one of the pulse-supplying output terminals of clock 260. The output of gate 336 is connected to the input pin of a one-shot multivibrator 338, and the output of multivibrator 338 is connected through a pulse shaper 340 to a pulse counting input pin of a BCD decade counter 342. As will be described in detail later on, operation of relays RY1, RY2 and RY3 is controlled by counter 342, and counter 342 determines the sequence in which relays RY1 and RY2 are operated by counting the number of cycles through which scanning arm 199 is stepped. The advancement of the remote counter wheels 320–323 is correlated with the sequence in which the meter counter wheels 36–39 are interrogated by the count in counter 342.

A switch 344 for resetting counter 342 is ganged to switch 232. One of the terminals of switch 334 is connected to ground, and the other terminal of switch 344 is connected through two serially connected inverters 346 and 348 to the reset pin of counter 342. When switch 232 is selectively, momentarily closed, switch 344 is also closed to momentarily apply zero potential to the reset pin of counter 342 for resetting the counter to zero. When counter 342 is reset to zero, the signal conditions on each of the three output pins A, B and C of counter 342 will go low. A truth table showing the logic states on output pins A, B and C of counter 342 is illustrated in FIG. 13.

As shown in FIG. 7B, counter pins A, B and C are respectively connected to the input sides of inverters 350, 351, and 352 in circuit 300. The output of inverter 350 is connected to one input of each of the gates 302 and 306 and also to the input side of a further inverter 353. The output of inverter 353 is connected to one input pin of gate 303 and also to a pair of input pins of gate 309. The output of inverter 351 is connected to one input pin of gate 306, to an input pin of gate 308, and also to an input pin of gate 310. The output of inverter 351 is also connected through another inverter 354 to an input pin of gate 302 and to the input side of still another inverter 355. The output of inverter 355 is connected to one input pin of gate 303 and also to one input pin of another Nand gate 356.

The output of inverter 352 is connected to one input pin of gate 302, to one input pin of gate 303, to input pin of gate 310, and to the input side of another inverter 358. The output of inverter 358 is connected to one input pin of gate 306, to one input pin of gate 308, and to one input pin of gate 356. The output of gate 302 is connected through a resistor to the base of a transistor 360. The emitter of transistor 360 it tied to ground. The collector of transistor 360 is connected through a resistor to the positive 16 volt output terminal of power source 70 and also to the base input terminal of a Darrington 362. The collector output of Darrington 362 is connected to one terminal of operating coil 316 which drives counter wheel 320. The other terminal of operating coil 316 is connected to the positive 16 volt output terminal of power source 70.

The output of gate 303 is connected through an inverter 364 to the remaining input pin of gate 304. The output of gate 303 is also connected to two input pins of gate 305. The output of gate 304 is connected through a resistor to the base of a transistor 366. The collector of transistor 366 is connected to the base input terminal of another Darlington 368 and also through a resistor to the positive output terminal of power source 70. The collector output pin of Darlington 368 is connected to one terminal of operating coil 317 which drives counter wheel 321. The other terminal of operating coil 317 is connected to the positive 16 volt output terminal of power source 70.

The output of gate 305 is connected through a resistor to the base input terminal of still another Darlington 370. The collector output of Darlington 370 is connected to one terminal of the operating winding of relay RY2. The other terminal of the operating winding of relay RY2 is connected to the positive 16 volt output terminal of power source 70.

The output of gate 306 is connected to the remaining input pin of gate 305 and also through an inverter 372 to the remaining input pin of gate 307. The output of gate 307 is connected through a resistor to the base of a transistor 374. The emitter of transistor 374 is tied to ground. The collector of transistor 374 is connected to the base input terminal of still another Darlington 376 and also through a resistor to the positive 16 volt output terminal of power source 70. The collector output of Darlington 376 is connected to one terminal of operating coil 318 which drives counter wheel 322. The other terminal of operating coil 318 is connected to the positive 16 volt output terminal of power source 70.

The output of gate 308 is connected to the input side of an inverter 380. The output of inverter 380 is connected to the remaining pin of gate 309 and also through a resistor to the base input terminal of a Darlington 382. The collector output of Darlington 382 is connected to one terminal of the operating winding of relay RY1. The other terminal of the operating winding of relay RY1 is connected to the positive 16 volt output terminal of power source 70.

The output of gate 309 is connected through a resistor to the base of a transistor 384. The emitter of transistor 384 is tied to ground. The collector of transistor 384 is connected to the base input pin of still another Darlington 386 and also through a resistor to the positive 16 volt output terminal of power source 70. The collector output of Darlington 386 is connected to one terminal of operating coil 319 which drives counter wheel 323. The other terminal of operating coil 319 is connected to the positive 16 volt output terminal of power source 70.

The output of gate 310 is connected to the input side of an inverter 388 and also to the input side of another inverter 390. The output of inverter 388 is connected to the remaining input pin of gate 311. The output of gate 311 is connected through a resistor to the base of a transistor 392. The emitter of transistor 392 is tied to ground. The collector of transistor 392 is connected to the base input pin of still another Darlington 394 and also through a resistor to a positive 16 volt output terminal of power source 70.

The terminal of operating coil 319 which is connected to the output to the Darlington 386 is also connected serially through a reset switch 400 and a blocking diode 402 to the collector output of Darlington 394. Similarly, the terminal of operating coil 318 which is connected to the output of Darlington 376 is also connected serially through a reset switch 404 and a diode 406 to the collector output of Darlington 394.

The output of inverter 390 is connected to the remaining input pin of gate 312, and the output of gate 312 is connected through a resistor to the base of a transistor 408. The emitter of transistor 408 is tied to ground. The collector of transistor 408 is connected to the base input of a Darlington 410 and also through a resistor to the positive 16 volt output terminal of power source 70. The terminal of operating coil 316 which is connected to the output of Darlington 362 is also connected serially through a reset switch 412 and a diode 418 to the collector output of Darlington 410. Similarly, the terminal of operating coil 317 which is connected to the output of Darlington 368 is also connected serially through a reset switch 416 and a blocking diode 414 to the collector output of Darlington 410.

The output of gate 356 is connected to both input pins of another Nand gate 420. Gate 420 is thus wired as an inverter and has its output connected through a resistor to the base input pin of another Darlington 422. The collector output pin of Darlington 422 is connected to one terminal of the operating winding of relay RY3. The other terminal of the operating winding of relay Ry3 is connected to the positive 16 volt output terminal of power source 70.

As shown in FIG. 7B, gate 305 is wired as a Nor gate. The signal logic resulting from the output of counter 342 and the components in circuit 300 is conventionally shown in FIG. 7B.

To remotely read out the volumetric registration of meter 22 with the apparatus thus far described, the meter reader plugs gun 50 into receptacle 48 and depresses pushbutton 245 to close the ganged switches 232 and 344. If one or more of the counter wheels 320–323 is not reset to its data void "Z" position at this stage, pushbutton 245 may be held in its depressed position to keep switch 344 closed until all of the counters register the reset letter Z.

Upon closing switch 344, counter 342 is reset to provide a low on each of its output pins A, B and C, and as long as switch 344 is held closed by holding pushbutton 245 in its depressed position, the logic states at the counter output pins A, B and C will remain low regardless of the number of pulses, if any, that are supplied to the pulse count-in of the counter.

As soon as counter 342 is reset by closing switch 344, energization of relay R3 will be prevented. More particularly, gate 356 supplies a logic 1 when the logic states on counter output pins B and C go low by resetting counter 342. The logic 1 at the output of gate 356 is inverted by gate 420 to keep Darlington 422 turned off. As a result, the output of Darlington 422 will be high to prevent the development of a sufficient voltage drop for energizing the operating winding of relay RY3. It will be appreciated that the application of a logic 1 to the input of each Darlington shown in FIGS. 7A and 7B turns the Darlington on, and an input of a logic 0 turns the Darlington off. When the Darlington is on its output is low, and when the Darlington is off, its output is high.

With relay RY3 de-energized, contacts R3-1 and R3-2 will be closed to complete a holding circuit around switch 232. By closing switch 232 pulse generator 260 will be energized from power source 70, and after pushbutton 245 is released to allow switch 252 to open, pulse generator 260 will remain energized through the holding circuit provided by contacts R3-1 and R3-2.

When the logic states on counter output pins A, B and C go low by resetting counter 342, gates 302, 304 307 and 309 will be disabled to block the transmittal of clock pulses to Darlington 362, 368, 376 and 386. Darlingtons 362, 368, 376 and 386 will therefore be turned off and consequently will be unable to energize the counter wheel stepper coils 316–319 even if gate 259 is enabled to transmit clock pulses to gates 302, 304, 307 and 309.

Darlingtons 370 and 382 will also be turned off when the logic state on at least the counter output pin C is low. As a result, relays RY1 and RY2 are de-energized when counter 342 is in its reset mode.

When the logic states on counter output pins B and C go low by resetting counter 342, the output of gate 310 goes low. It will be noted that the output of gate 310 will be low only when the logic states on both of the counter output pins B and C are low.

The logic 0 at the output of gate 310 is inverted by inverters 388 and 390 to respectively enable gates 311 and 312. As a result, clock pulses from generator 260 will be applied to the inputs of Darlingtons 394 and 410 to periodically turn Darlingtons 394 and 410 on for pulsing the counter stepper coils 316–319 if their associated reset switches 412, 416, 404 and 400 are closed. Each of the reset switches 412, 416, 404, and 400 will be closed if its associated counter wheel is not reset to its Z position.

Coils 316–319, upon being pulsed, step their associated counter wheels toward the Z position through suitable counter wheel stepping mechanisms. As each of the counter wheels 320–323 reaches its Z position, it opens its associated reset switch through suitable motion transmitting means to interrupt the pulsing circuit to its associated stepper coil (316–319).

As long as switch 344 is held closed, counter 342 will be held in its reset mode to enable pulses to be applied through Darlingtons 394 and 410 for pulsing coils 316–319 until all of the counter wheels 320–323 are reset to their Z positions. Upon resetting counter wheels 320–323, pushbutton 245 is released to allow switches 232 and 344 to open.

At the same time that coils 316–319 are being pulsed to reset counter wheels 320–323, the scanner stepper coil 274 is also being pulsed by the pulses that are supplied by pulse generator 260. As a result, scanning arm 199 will be stepped and may arrive at any one of its twelve positions in bank 200.

Assume, for example, that scanning arm 199 arrives at branch 207 when the resetting of counter wheels 320–323 is completed and switches 232 and 344 are opened. Coil 274 will continue to be pulsed by pulses from generator 260 since generator 260 remains energized.

When scanning arm 199 is stepped from branch 212 to branch 201, it momentarily closes switch 330. By closing switch 330, the output of gate 334 goes high, and when a clock pulse is received at the input of gate 336 during the period that switch 330 is closed and scanning arm 199 is stepping from branch 212 to branch 201, the output of gate 336 will go from high to low.

Multivibrator 338 will be triggered by the transistion of the output of gate 336 from high to low to supply a pulse through pulse shaper 340 to the pulse count-in pin of counter 342.

Assuming that switch 344 has been opened at this stage to place counter 342 in its pulse counting mode, counter 342 will count the pulse supplied by multivibrator 338. The output of counter 342 will therefore change in the manner shown in the table of FIG. 13. Thus, the logic state on counter output pin A will go high, while the logic states on output pins B and C remain low. These logic states will be held at the output of counter 342 until scanning arm 199 has completed a full scanning cycle and again closes switch 330.

Under the foregoing counter output logic conditions, gates 311 and 312 remains enabled, gates 302, 304, 307 and 309 remain disabled to block the transmittal of clock pulses to Darringtons 362, 368, 376 and 386, and gates 305 and 308 keep Darringtons 370 and 382 in their turned-off states. As a result, relays RY1 and RY2 remain de-energized, Darringtons 362, 368, 376 and 386 remain incapable of pulsing coils 316–319, and Darringtons 394 and 410 remain operative to pulse coils 316–319 in the event that their associated reset switches 412, 416, 404 and 400 have not been opened. By providing twelve circuit branches in bank 200 to require twelve clock pulses to step scanning arm 199 through one complete cycle, a corresponding and sufficient number of clock pulses are made available to ensure that counter wheels 320–323 are reset before the next pulse is counted in by counter 342.

After completing its first full cycle with counter 342 in a counting mode, scanning arm 199 will again momentarily close switch 330 as it steps from circuit branch 212 to circuit branch 201. As a result, multivibrator 338 will again be triggered and the resulting pulse will be counted in by counter 342 to provide a count of two. Thus, the logic states on output pins A and B will respectively go low and high, and the logic state at output pin C will remain a logic 0.

By changing the logic state on output pin B to a logic 1, the output of gate 310 goes high. As a result, the output of gates 311 and 312 go high, causing the collector voltage on transistors 392 and 408 to go low to turn off Darlingtons 394 and 410. Darlingtons 394 and 410 are therefore rendered inoperative to supply reset pulses to coils 316–319 as long as the logic state on at least one of the output pins B and C is high.

By providing a logic 1 on output pin B and a logic 0 on each of the output pins A and C, the outputs of gates 303–309 are such that Darlingtons 368, 370, 376, 382 and 386 remain in their turned-off states. Relays RY1 and RY2 therefore remain de-energized, and Darlingtons 368, 376, and 386 will remain inoperative to supply pulses to coils 317–319. For this cycle of scanning arm 199, counter wheels 321–323 will not be advanced by clock pulses. Gate 302, however, will be enabled by the logic 1 on output pin B and the logic 0 on each of the output pins A and C. As a result, gate 302 will transmit clock pulses to transistor 360 as long as bridge circuit 199 remains underbalanced to keep gate 259 enabled.

When scanning arm 199 arrives at branch 201 bridge circuit 192 will be underbalanced when any one of the resistors 141–150 is connected between terminals 191 and 194 because branch 201 has no resistor and effectively provides a short circuit between terminals 191 and 193. Therefore one clock pulse will be gated through gates 259 and 302 to transistor 360, and scanner arm 199 will be stepped to circuit branch 202.

At this stage relays RY1 and RY2 are de-energized as previously mentioned. As a result, circuit 108, which is operatively associated with counter wheel 36, will be under interrogation, and the one of resistors 141–150 that completes a circuit through contact plate 114 will be in the active bridge circuit between terminals 191 and 194.

The first clock pulse gated through gates 259 and 302 causes the output of gate 302 to go high for the duration of the pulse. The collector voltage on transistor 360 therefore goes high momentarily to turn Darlington 362 on. As a consequence coil 316 will be pulsed to advance counter wheel 320 from its Z to its next data void position where it registers the letter N.

When scanning arm 199 arrives at branch 202, bridge circuit 192 remains underbalanced, since the resistance value of branch 202 is less than that of any of the resistors 141–150. A second clock pulse will therefore be gated through gates 259 and 302 to cause Darlington 362 to again pulse coil 316. Counter wheel 320 will consequently be stepped to its next position where it registers the digit "1."

Assume that counter wheel 36 is registering the digit 1. As a result resistor 141 will be connected by contact plate 114 in the active bridge circuit leg between terminals 191 and 194. Thus when scanning arm 199 is stepped from branch 202 to branch 203, bridge circuit 199 becomes overbalanced since the value of resistor 214 is greater than that of resistor 141. Transistor 250 therefore becomes reversed biased to disable gate 259, thereby blocking the transmittal of further pulses to coil 316. Advancement of counter wheel 320 will consequently cease at its position where it registers the digit "1." It will be noted that when scanning arm 199 is between branches in bank 200, the resistance between terminals 191 and 193 is infinite, and gate 259 is therefore momentarily disabled.

For the position of contact plate 114 shown in FIG. 6A, bridge circuit 192 will not become overbalanced until scanning arm 199 has stepped to circuit branch 208. Seven clock pulses will therefore be gated to Darlington 362 to pulse coil 316 seven times. Thus counter wheel 320 will be advanced seven positions to register the digit "6" in correspondence with the registration on counter wheel 36. Upon stepping scanning arm 199 to circuit branch 208 bridge circuit 192 becomes overbalanced and gate 279 consequently becomes disabled to block the transmittal of further pulses to coil 316.

Scanning arm 199 continues to step through bank 200 after bridge circuit 192 becomes overbalanced to complete its cycle. As scanning arm 199 steps from branch 212 to branch 201 to start a new cycle, switch 330 is again momentarily closed and the resulting pulse supplied by multivibrator 338 is counted in by counter 342, all in the manner previously described. Upon counting in this pulse, the logic states on output pin A will change from low to high, and the logic states on output pins B and C will respectively remain high and low.

With a logic 1 on each of the output pins A and B and with the logic 0 on output pin C, the following conditions occur in circuit 300: Gate 302 will become disabled to block the transmittal of any clock pulses applied to its input, and Darlington 362 will therefore be turned off so that it is now inoperable to advance counter wheel 320 by pulsing coil 316; gates 307 and 309 will remain disabled to block the transmittal of pulses for pulsing coils 318 and 319; the output of gate 308 will remain high to keep Darlington 382 turned off and to thereby keep relay RY1 de-energized; gate 304 will be enabled to gate clock pulses to transistor 366; and the output of gate 305 will go high to turn on Darlington 370 to thereby energize relay RY2.

With relays RY2 and RY1 respectively energized and de-energized, circuit 109 will be placed under interrogation so that the resistor in the active bridge circuit leg between bridge terminals 191 and 194 will be one that provides a completed circuit through contact plate 114b. For the position of contact plate 114b shown in FIG. 6A, resistor 150 will be connected between terminals 191 and 194.

When scanning arm 199 starts its new cycle, bridge circuit 192 will revert to its underbalanced condition to thereby enable gate 259. The clock pulse transmitted through gate 259 will not be gated through gate 304, causing Darrington 368 to momentarily turn on with each gated pulse. Coil 317 will therefore be pulsed to advance counter wheel 321 from its Z position. When scanning arm 199 is advanced to branch 212, bridge circuit 192 becomes overbalanced, and gate 259 will consequently become disabled to block the transmittal of further clock pulses for advancing counter wheel 317.

Upon transfer of scanning arm 199 from circuit branch 212 to circuit branch 201, scanning arm 199 again momentarily closes switch 330, and the resulting pulse produced by multivibrator 338 is counted in by counter 342. As a result the logic states on output pins A and B change from high to low, and the logic state on output pin C changes from low to high. With these logic states, gates 302, 304 and 309 will be disabled to block the transmittal of pulses for advancing counter wheels 320, 321 and 322, but gate 307 will be enabled to gate clock pulses to transistor 374. Also, the output of gate 305 will remain high to keep relay RY2 energized, and the output of gate 308 will go low. The low at the output of gate 308 is inverted to turn Darlington 382 on, thereby energizing relay RY1. For this cycle, therefore, both relays R1 and RY2 will be energized to place circuit 110 under interrogation and clock pulses from generator 260 will be transmitted through gates 259 and 307 to cause Darlington 376 to pulse coil 318 as long as bridge circuit 192 remains underbalanced. Thus, counter wheel 322 will be advanced until bridge circuit 192 becomes overbalanced to cause gate 259 to block the transmittal of further counter wheel-advancing pulses. In this manner counter wheel 322 will be advanced to a position corresponding to that of counter wheel 38.

Upon completing its cycle for interrogating circuit 110 and upon stepping from circuit branch 212 to circuit branch 201, scanning arm 199 again momentarily closes switch 330. The resulting pulse that is produced by multivibrator 338 is counted in by counter 342 to change the logic state on output pin A to a logic 1. Therefore, the logic states on output pins A, B, C will now respectively be a logic 1, a logic 0, and a logic 1. With these logic states, gates 302, 30, and 307 will be disabled to block the transmittal of clock pulses for pulsing coils 316–318, and gate 309 will be enabled to gate clock pulses to transistor 384. Also, the output of gate 308 remains low to keep relay RY1 energized, but the output of gate 305 will go low to turn off Darlington 370. Thus, for this cycle of scanning arm 199, relays RY1 and RY2 will respectively be energized and de-energized to place circuit 111 under interrogation, and only counter wheel 323 will be advanced by the clock pulses by virtue of gate 309 being enabled and gates 302, 304, and 307 being disabled. The number of clock pulses transmitted by gate 259 will now depend upon the position of contact plate 114c and consequently upon the position of counter wheel 37.

Upon completing its interrogation cycle for circuit 111, scanning arm 199 steps from circuit branch 212 to circuit branch 201 to again momentarily close switch 330. Counter 342 therefore counts in another pulse to cause the logic states on output pins A and B to respectively change to a logic 0 and a logic 1. The logic state on output pin C will remain high.

With the foregoing logic states on output pins A, B and C, all of the gates 302, 304, 307 and 309 will be disabled to block the transmittal of counter-advancing pulses to coils 316–319, the output of gate 308 will go high to cause Darlington 382 to de-energize relay RY1 the output of gate 305 will remain low to prevent Darlington 370 from energizing relay RY2 and the output of gate 356 will go low. The logic 0 at the output of gate 356 is inverted by gate 420 to provide a logic 1 which turns Darlington 422 on. Relay RY3 will therefore be energized to open contacts RY3–1 and RY3–2, thus interrupting the holding circuit around switch 232 and thereby removing battery power from the circuit.

In the event that a defect in any one or more of the data source circuits 108–111 produces a short circuit between the associated conductors in transmission line 46, the associated counter wheel in unit 20 will not be advanced from its reset, data-void "Z" position when the defective circuit is interrogated. This condition will occur because bridge circuit 192 will immediately become overbalanced to inhibit gate 259 and thereby block the supply of counter-advancing pulses when scanning arm 199 inserts branch 201 into the bridge. The small resistance in the conductor making up branch 201 will be sufficient to overbalance the bridge circuit.

In the event that a defect in any one of the data source circuits 108–111 being interrogated produces an open circuit between the associated conductors of transmission line 46, the associated counter wheel in unit 20 will be advanced through a complete revolution to return to its data void "Z" position because the open circuit provides an infinite bridge leg resistance which is obviously greater than any of the resistances in bank 200. Under such a condition, bridge circuit 192 cannot become overbalanced, thus allowing pulses to be supplied to advance the associated counter wheel until scanning arm cycle is completed and the output of counter 342 changes when scanning arm 199 steps from branch 212 to branch 201 to start a new cycle. Thus, a visual indication is provided on counter mechanism 72 if any one or more of the circuits 109–111 has a short or open circuit.

Figure 8:
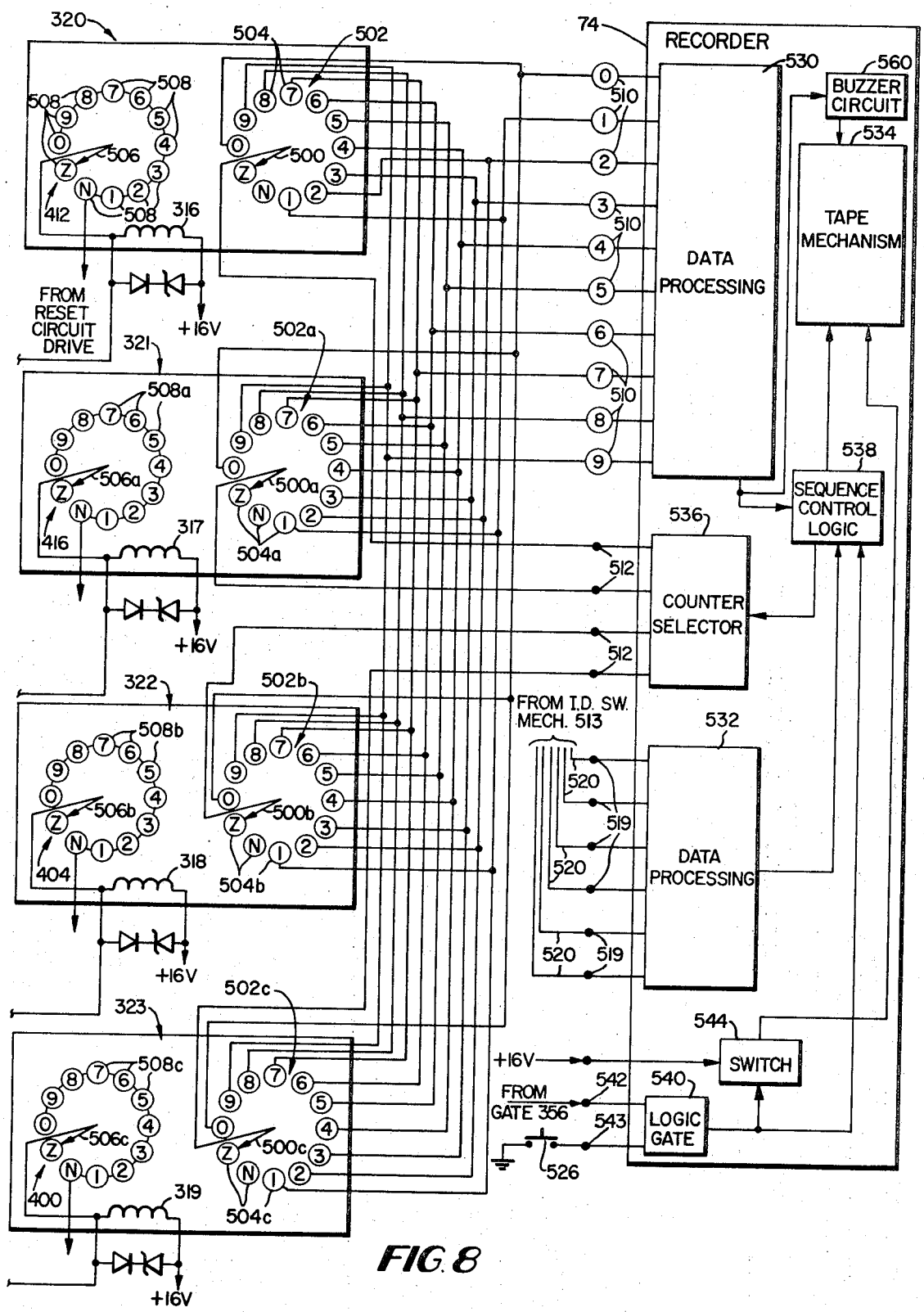
FIG. 8 schematically illustrates a portion of the circuit contained in the remote read-out unit and the connections for the recorder in the remote read-out unit.

Referring to FIG. 8, coil 316, upon being pulsed, steps a wiper arm 500 in a stepper switch mechanism 502. Arm 500 and counter wheel 320 are connected to each other in such a manner that they rotate in unison. Switch mechanism 502, which forms a part of the remote read-out counter apparatus, has 12 contacts 504 that are sequentially contacted by arm 500 by pulsing coil 316. Contacts 504 are respectively located at the 12 positions of the counter wheel, and when counter wheel 320 is at its Z, N, 1, 2, 3, 4, 5, 6, 7, 8, 9, and 0 position, arm 500 respectively engages the correspondingly marked ones of contacts 504.

Counter wheels 321–323 are respectively provided with switch mechanisms 502a, 502b, and 502c that are the same as switch mechanism 502. Accordingly like reference numerals suffixed by the letter a have been applied to designate the parts of switch mechanism 502a, like reference numerals suffixed by the letter b have been applied to designate like parts of switch mechanism 502b, and like reference numerals suffixed by the letter c have been applied to designate switch mechanism 502c.

Switch mechanisms 502, 502a, 502b, and 502c are connected to recorder 74 in a manner to be described in detail later on.

Still referring to FIG. 8, reset switch 412 comprises a rotatable wiper arm 506 and a bank of twelve switch contacts 508. Arm 506 is suitably ganged to arm 500 or it may otherwise be secured to counter wheel 320 to rotate therewith. Contacts 508 are respectively located at the twelve positions of the counter wheel, and when the counter wheel is at its Z, N, 1, 2, 3, 4, 5, 6, 7, 8, 9, and 0 positions, arm 506 respectively engages the correspondingly marked ones of contacts 508. In switch 412, the contact corresponding to the counter wheel's "N" position is connected through diode 418 to the output of Darrington 410, and the eleven contacts that correspond respectively to the N, 1, 2, 3, 4, 5, 6, 7, 8, 9 and 0 positions of the counter wheel are connected in series. Thus when arm 506 engages any one of these eleven reset switch contacts, a circuit connection will be completed to pulse the stepper coil 316 for resetting the counter wheel to its "Z" position in the event that Darrington 410 is turned on.

The one of the reset switch contacts 508 corresponding to the reset data void "Z" position of the counter wheel is electrically isolated from the other switch contacts so that when arm 506 is stepped to the "Z" position contact the circuit connection for pulsing coil 316 from Darrington 410 is interrupted, thus stopping the counter wheel at its reset, data-void "Z" position.

As shown in FIG. 8, reset switches 400, 404, and 416 are the same as switch 412 and are connected in the same manner as that just described for reset switch 412. Thus each reset switch has a stepping switch arm that is rotated in unison with its associated counter wheel to maintain a reset circuit connection as long as the counter wheel is at a position other than its "Z" position and to interrupt the reset circuit connection when the counter wheel is rotated to its "Z" position.

With the exception of those contacts in switches 502, 502a, 502b, and 502c that correspond to the "Z" and "N" positions of counter wheels 320–323, contacts 504, 504a, 504b, and 504c are connected in parallel to ten correspondingly marked data input terminals 510 of recorder 74 in the manner shown in FIG. 8. Wiper arms 500, 500a, 500b, and 500c are respectively connected to four serparate input terminals 512 of recorder 74. The potentials supplied to input terminals 510 and 512 are utilized by recorder 74 in any suitable manner to record the registration of counter wheels 320–323.

In addition to recording the registration of counter mechanism 72, identification data is also recorded by the recorder. The identification is supplied by an identification data source contained within receptacle 48.

As shown in FIG. 2, the identification data source may comprise a suitable switch mechanism 513 having a series of conventional multi-position decimal switches 514. Each decimal switches has a selectively manipulatable 10-position selector 516 for connecting different resistances into an active circuit to correspond with the selected digit. In this embodiment, six decimal switches are shown to thereby provide a six digit identification number. Switch mechanism 513 is mounted in any suitable manner in receptacle 48. Corresponding terminals of switches 524 may respectively be connected to six separate printed strips 517 on card 61. The other terminals of switches 514 may be connected to a circuit-completing ground Each of the switches 514 therefore bridges a selected resistance across a common ground and its associated circuit strip 517.

The six circuit strips 517 are respectively adapted to be electrically and detachably connected to a corresponding number of separate contact elements 518 in gun 50 when gun 50 is inserted into receptacle 48 by the person taking the meter reading. Contact elements 518 are connected in parallel to separate data input terminals 519 of recorder 74 by separate conductors 520 which form a part of cable 66.

Recorder 74 is energized by power from source 70 and may be of any suitable conventional type such as a motor driven magnetic tape cassette having appropriate data processing circuits for receiving the information that is supplied in electrical signal form to the recorder's data input terminals and for applying the information to the tape or other data processing input means. Recorder 74 is equipped to respond to a recording command that is derived from circuit 300 or from a selectively applied recording command that is derived by actuating a manual entry switch 526 (FIGS. 8 and 9).

The recording command from circuit 300 is provided by the logic output of gate 356. As previously described, the output of gate 356 will change from high to low only after all of the data source circuits have been interrogated and counter wheels 320-323 have been set up to remotely register the meter reading. If switch 526 is open, a logic 1 at the output of gate 356 prevents recorder 74 from recording the information that is supplied to its data input terminals. But when the output of gate 356 goes low, signifying the completion of the remote read-out, recorder 74 responds by recording the information applied to its data input terminals in a preselected order. For example, the identification data from switch mechanism 513 may be recorded first, followed in a sequential order by the information from switches 502, 502a, 502b and 502c of counter wheels 320-323. The identification data may be recorded twice to ensure positive identification. The identification may be utilized to identify a customer, a particular meter or a meter installation for billing or any other desired purpose. Switches 514 are selectively settable to provide a selected identification number.

To achieve the foregoing recording operation, recorder 74, for example, may include suitable data processing circuits 530 and 532 for respectively receiving the data signals applied to terminals 510 and 512 and for converting the received signals into signal forms that is recordable on a magnetic tape or other data recording means which is indicated at 534. Terminals 512 may be connected to a suitable counter wheel selector circuit 536 which may be controlled by a suitable sequence control logic circuit 538. In response to a recording command from a sutiable logic gate 540, circuit 538 first applies the identification information to the data recording means for recording. Following that, circuit 538 then causes circuit 536 to sequentially select contact wiper arms 500, 500a, 500b, and 500c which, in turn, causes circuit 530 to sequentially supply the registration of counters wheels 320-323 for recording. The inputs of logic gate 540 are connected to input terminals 542 and 543 which are respectively connected to the output of gate 356 and to one terminal of switch 526. The other terminal of switch 526 is connected to ground so that when it is selectively actuated to its closed, manual entry position by the meter reader, a logic 0 will be applied to logic gate 540. Thus, when a logic 0 is supplied to gate 540 by either gate 356 or by switch 526, logic gate 540 will supply a command signal to start recording the data supplied to terminals 510 and 512. In addition, the recording command signal supplied by logic gate 540 may be applied to a transistor or other sutiable switch 544 to turn switch 544 on. By turning switch 544 on, power is applied to energize the recorder.

To facilitate recordation of selected information, each of the counter wheels 320-323 is independently and selectively rotatable to a selected position by any suitable means. For example, a rotatable thumb wheel 550 (FIG. 9) may be drive connected to each of the counter wheels 320-323. Thumb wheels 550 are accessible for manual rotation to rotate counter wheels 320-323 to selected positions and to thereby set up the counter wheels for reading out a selected number. By rotating counter wheels 320-323 to selected positions, wiper arms 500, 500a, 500b, and 500c are also rotated to corresponding contacts in switch mechanisms 502, 502a, 502b and 502c to thereby apply the selected number in electrical signal form to the data input terminals of recorder 74. Alternatively, a suitable circuit may be provided for utilizing pulses to selectively advance counter wheels 320-323 to selected positions by selectively pulsing coils 316-319. Such a circuit would include a selectively actuatable switch (not shown) for each counter wheel stepper coil for selectively completing a circuit to pulse each of the coils 316-319.

In the event that a meter is not equipped for a remote read-out, the meter reader may read off the registration of the un-equipped meter, selectively set up counter wheels 320-323 to read out the meter registration, and then actuate switch 526 to its closed position to command the recorder to record the selected data applied to terminals 510. If the unequipped meter does not have an identification switch mechanism, an auxiliary switch mechanism corresponding to switch mechanism 513 may be connected to gun 50 or to an auxiliary data input of the recorder to supply identification information for recordation.

For convenience, receptacle 48 with the identification switch mechanism 513 and printed circuit card 61 mounted therein may be installed at the site of a meter that is not equipped for a remote read-out. In such an installation there is no connection between the meter and printed circuit card 61. To record the meter registration and identification data, the meter reader selectively sets counter wheels 320-323 to read out the meter registration as previously described, plugs gun 50 into receptacle 48, and actuates switch 526 to its closed, manual entry position. The identification data and the meter registration data manually set up on counter wheels 320-323 will thereby be sequentially recorded by the recorder.

It will be appreciated that when switch 526 is in its open position, recorder 74 will not record the data supplied to its data input terminals until the output of gate 356 becomes a logic 0. Thus, as long as switch 526 is open, recorder 74 remains under the control of circuit 300.

As previously described the two contacts that respectively correspond to the "Z" and "N" data void positions in switch mechanisms 502, 502[a, 502b and 502c are not connected to the recorder. Thus, if any one of the counter wheels 320–323 is at either one of its data void positions, signifying an erroneous read-out of information, it will not apply any data to any of the data input terminals 510. Under such a condition, circuit 530 will not supply any data at its output for the associated counter wheel. The output of circuit 530 may be connected to a suitable buzzer circuit 560 which provides one audible indication when data to be recorded is supplied at the output of circuit 530 and a different audible indication when there is an absence of data at the output of circuit 530. For each counter wheel there will be an absence of data at the output of circuit 530 if the counter wheel is at either of its two data void and N positions. Thus, an audible signal, as well as a visual indication will occur when any one or more of counter wheels 320–323 is at either of its data void Z and N positions. For each of the counter wheels 320–323, the audible indications supplied by buzzer circuit 560 may be a continuous tone if the counter wheel is at positions to register zero or any digit and an intermittent tone if the counter wheel is at either one of its data void positions. The buzzer tone may also be recorded on the magnetic tape.

From the foregoing description it will be appreciated that selective actuation of switch 344 provides a read-out command signal and that the circuit of this invention is responsive to the command signal for resetting counter mechanism 72, then advancing counter mechanism 72 to register the meter reading, and finally activating recorder 74 to record the registration of counter mechanism 72 along with the identification from switch mechanism 513. It also will be appreciated that counter mechanism 72 forms a part of a remote meter reading register, and that the associated stepper switch mechanisms 502, 502a, 502b and 502c are operative to count the number of generator-supplied pulses for respectively advancing counter wheels 320–323. It also will be appreciated that circuits 108–111 perform encoding functions in that each circuit supplies electrical energy at different pre-selected coded voltage levels for the different registration positions of its associated meter register counter wheel. The coded signals developed by circuits 108–111 are thus in the form of coded voltage levels.

In addition, it will be appreciated that when a meter is equipped with the remote meter reading apparatus of this invention, the visual display provided by meter register 32 may be eliminated. It also will be appreciated that various features of this invention are applicable to utility type meters other than fluid flow gas or liquid meters.

In the claims, the term "digit" is intended to signify zero as well as the decimal number 1 through 9.

What is claimed and desired to be secured by Letters Patent is:

1. In combination with a meter having at least one element that is displaced to different positions to indicate different metered quantities, a remote meter reading apparatus comprising a resistance bridge circuit having a pair of output terminals, means for energizing said bridge circuit with a d.c. potential, means unbalancing said bridge circuit at its output terminals, means sensing the position of said element by effecting a reversal of the polarity of the potential measured across said output terminals, indicating means, and means under the control of the polarity of the potential at said output terminals for causing said indicating means to indicate the quantity that is indicated by the position of said element.

2. The combination defined in claim 1 wherein said indicating means comprises counter means, and wherein said means under the control of said polarity at said output terminals comprises a circuit for advancing said counter means as long as the potential across said output terminals is of one polarity, said circuit for advancing said counter means being responsive to said reversal of polarity for terminating advancement of said counter means.

3. In combination with a meter having at least one rotatable element whose rotation to different positions is indicative of different metered quantities, a remote meter reading apparatus comprising a resistance bridge circuit having a pair of output terminals and first and second legs connected to said output terminals, means for energizing said bridge circuit with a d.c. potential, means under the control of said element for providing said first leg with a different position-indicating resistance value for each of said positions of said element, means for incrementally varying the resistance in said second leg in a pre-selected direction to sequentially provide said second leg with different pre-selected values of resistance which each differ from each position-indicating resistance value for said first leg to prevent said bridge circuit from being balanced by the resistances in said first and second legs, there being a different one of said second leg resistance values for each position indicating resistance value that causes a reversal of polarity at said output terminals, means connected to said output terminals for detecting said reversal of polarity, and means under the control of said detecting means for providing an indication of the quantity that is indicated by the position of said element.

4. In combination with a meter having at least one rotatable element whose rotation to different positions is indicative of different metered quantities, a remote meter reading apparatus comprising a bridge circuit having a pair of output terminals and first and second legs connected to said output terminals, means for energizing said bridge circuit with a d.c. potential, means under the control of said element for providing said first leg with a different position-indicating resistance value for each of said positions of said element, means for sequentially providing said second leg with a series of different resistance values, said second leg resistance values being pre-selected to unbalance said bridge circuit at its output terminals for any position-indicating resistance value in said first leg, there being a different one of said second leg resistance values for each position-indicating resistance value that effects a reversal of the polarity of the potential measured across said output terminals from one polarity to the opposite polarity, means connected to said output terminals for developing a signal that is indicative of the polarity of the potential across said output terminals, and means under the control of said signal for providing an indication of the quantity that is indicated by the position of said element.

5. The combination defined in claim 4 wherein said indication-providing means comprises a recorder for recording the quantity that is indicated by the position of said element.

6. The combination defined in claim 4 wherein said bridge circuit is a four-legged bridge, and wherein said first and second legs are connected in series between said output terminals.

7. In combination with a meter having at least one rotatable element whose rotation to different positions is indicative of different metered quantities, a remote meter reading apparatus comprising a bridge circuit having a pair of output terminals and first and second legs connected to said output terminals, means for energizing said bridge circuit with a d.c. potential, means under the control of said element for providing said first leg with a different position-indicating resistance value for each of said positions of said element, pulse generator means for developing electrical pulses, means operated by said pulses for sequentially providing said second leg with a series of different resistance values to incrementally vary the resistance in said second leg in a preselected direction, said second leg resistance values being pre-selected to unbalance said bridge circuit at its output terminals for any position-indicating resistance value in said first leg, there being a different one of said second leg resistance values for each position-indicating resistance value that reverses the polarity of the potential measured across said output terminals, means connected to said output terminals for detecting the polarity of the potential across said output terminals, pulse counting means for counting pulses transmitted thereto, means under the control of said detecting means for transmitting a train of said pulses to said pulse counting means in which the number of pulses in said train is a function of the quantity indicated by the position of said element, and means under the control of said pulse counting means for providing an indication of the quantity that is indicated by the position of said element, said detecting means being effective to cause said pulse transmitting means to transmit pulses to said pulse counting means as long as the potential across said output terminals is of one pre-selected polarity, and said detecting means being responsive to the reversal of polarity of the potential across said output terminals to cause said transmitting means to terminate the transmittal of pulses to said counting means.

8. In combination with a meter having at least one rotatable element whose rotation to different positions is indicative of different metered quantities, a remote meter reading apparatus comprising a resistance bridge having a pair of output terminals, means for energizing said bridge with a d.c. potential, means for unbalancing said bridge, one side relative to the other, by a pre-selected magnitude that is peculiar to the quantity-indicating position of said element, means for changing the unbalance of said bridge in a pre-selected direction by a series of successive, descrete, pre-selected incremental steps, the magnitudes of two successive predetermined ones of said steps in said series being respectively greater than and smaller than said pre-selected magnitude to effect a reversal in the polarity of the potential at said output terminals upon changing the unbalance by the succeeding one of said two predetermined ones of said steps, means connected to said output terminals for detecting said reversal in the polarity of the potential at said output terminals, means under the control of said detecting means for supplying a train of pulses in which the number of pulses is indicative of the number of said incremental steps required to effect the reversal in polarity at said output terminals, and counter means for counting the number of pulses in said train.

* * * * *

PO-1050
(5/69)

UNITED STATES PATENT OFFICE
CERTIFICATE OF CORRECTION

Patent No. 3,806,904          Dated April 23, 1974

Inventor(s) Eugene M. Weinberger, Thomas M. Kirby,

It is certified that error appears in the above-identified patent and that said Letters Patent are hereby corrected as shown below:

Cover page, line [73] delete "Rockwell Manufacturing Company" and insert --Rockwell International Corporation--.

Column 14, line 30, delete "-16" and insert --+16--.

Column 16, line 33, delete "it" and insert --is--.

Column 24, line 63, delete "524" and insert --514--.

Signed and sealed this 29th day of April 1975.

(SEAL)
Attest:

RUTH C. MASON
Attesting Officer

C. MARSHALL DANN
Commissioner of Patents
and Trademarks